(12) United States Patent
Watanabe

(10) Patent No.: US 6,244,792 B1
(45) Date of Patent: Jun. 12, 2001

(54) DRILL JIG FOR SPECTACLE LENS MANUFACTURE JIG THEREOF, METHOD OF DRILLING FOR SPECTACLE LENS, AND SPECTACLE LENS

(75) Inventor: Shigeru Watanabe, Akiruno (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/367,217

(22) PCT Filed: Jan. 25, 1999

(86) PCT No.: PCT/JP99/00271

§ 371 Date: Aug. 10, 1999

§ 102(e) Date: Aug. 10, 1999

(87) PCT Pub. No.: WO99/37449

PCT Pub. Date: Jul. 29, 1999

(30) Foreign Application Priority Data

Jan. 26, 1998 (JP) .................................................. 10-012747

(51) Int. Cl.[7] .............................. B23B 35/00; B23B 47/28
(52) U.S. Cl. ....................... 408/1 R; 408/103; 408/115 R
(58) Field of Search .............................. 408/1 R, 97, 103, 408/104, 115 R, 72 B, 115 B, 241 B; 409/219, 225, 903; 269/303

(56) References Cited

U.S. PATENT DOCUMENTS

| | | | |
|---|---|---|---|
| 3,211,026 | * 10/1965 | Calahan | 408/103 |
| 3,352,183 | * 11/1967 | Howsare | 408/103 |
| 3,761,193 | * 9/1973 | Del Guidice | 408/103 |
| 3,905,085 | * 9/1975 | Whiting et al. | 29/418 |
| 4,190,480 | * 2/1980 | Ebert | 156/296 |
| 4,790,695 | * 12/1988 | Abernthy | 408/103 |
| 5,209,614 | * 5/1993 | Matthews | 408/103 |
| 5,409,329 | * 4/1995 | Juang | 408/103 |
| 5,466,098 | * 11/1995 | Juang | 408/103 |
| 5,733,077 | * 3/1998 | MacIntosh, Jr. | 408/103 |
| 5,807,033 | * 9/1998 | Benway | 408/115 R |
| 5,838,417 | * 11/1998 | Dahan et al. | 351/42 |

FOREIGN PATENT DOCUMENTS

| | | | |
|---|---|---|---|
| 3-10786 | 2/1995 | (JP) . | |
| 7-230062 | 8/1995 | (JP) . | |
| 9-38955 | 2/1997 | (JP) . | |
| 9-258139 | 10/1997 | (JP) . | |
| WO 88/03848 | * 6/1988 | (WO) | 408/115 R |

* cited by examiner

*Primary Examiner*—Daniel W. Howell
(74) *Attorney, Agent, or Firm*—Flynn, Thiel, Boutell & Tanis, P.C.

(57) ABSTRACT

A drill jig for a spectacle lens forms a closed-end hole in an edged face of the spectacle lens which extends inside the lens, a manufacture jig thereof, a method of drilling a spectacle lens, and a spectacle lens. The drill jig is composed of a jig body and a plurality of support members attached to the jig body. The spectacle lens is inserted and tightly retained in an opening of the jig body and supported by a plurality of the support members. A drill of a drill press, on which the drill jig is set, touches the edged face of the spectacle lens while being guided by a guide portion to thereby form the closed-end hole in the edged face.

21 Claims, 16 Drawing Sheets

F I G. 1 2
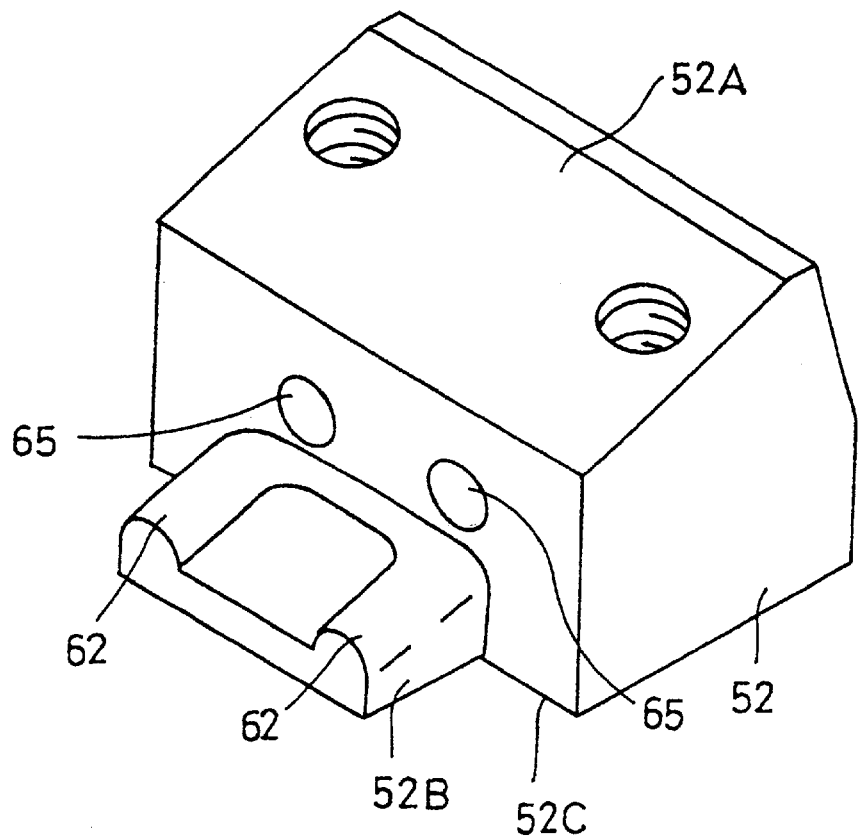
F I G. 1 3
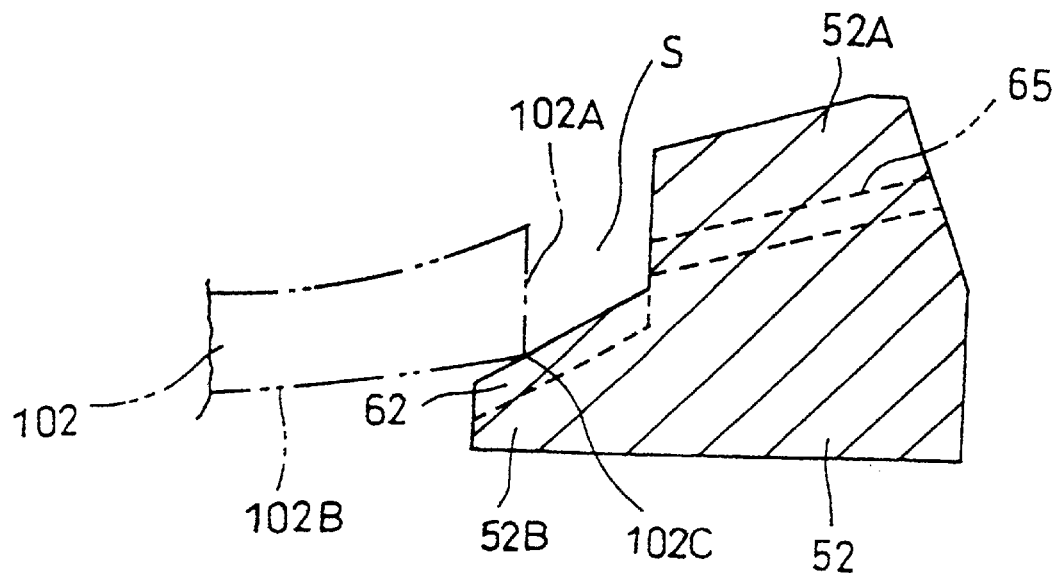

F I G. 1 6
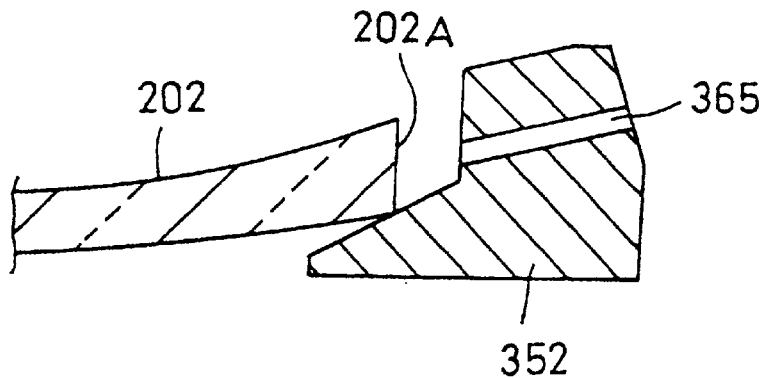
F I G. 1 7
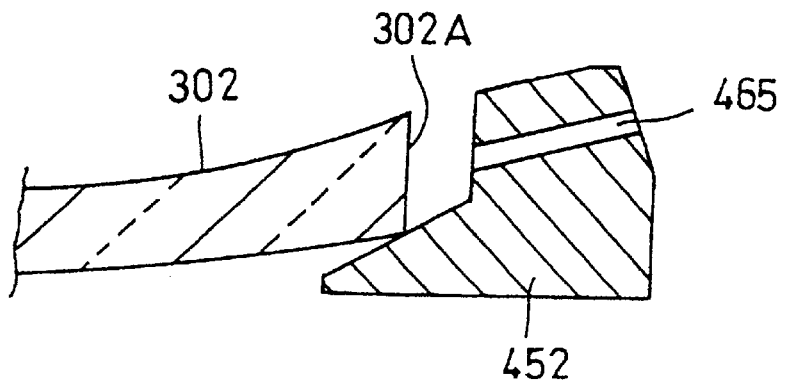
F I G. 1 8
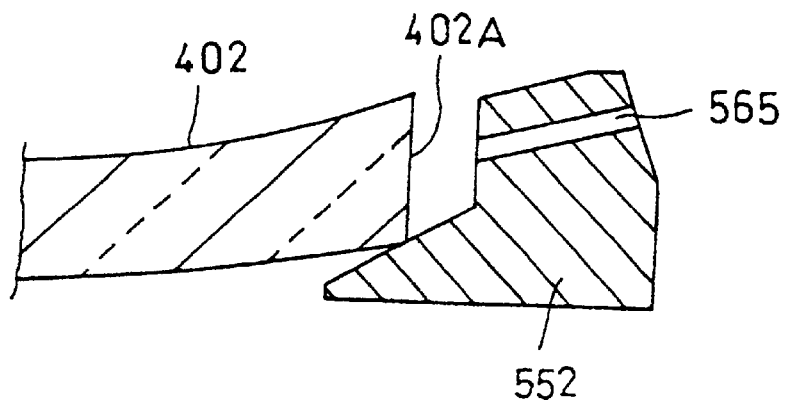

F I G. 2 2
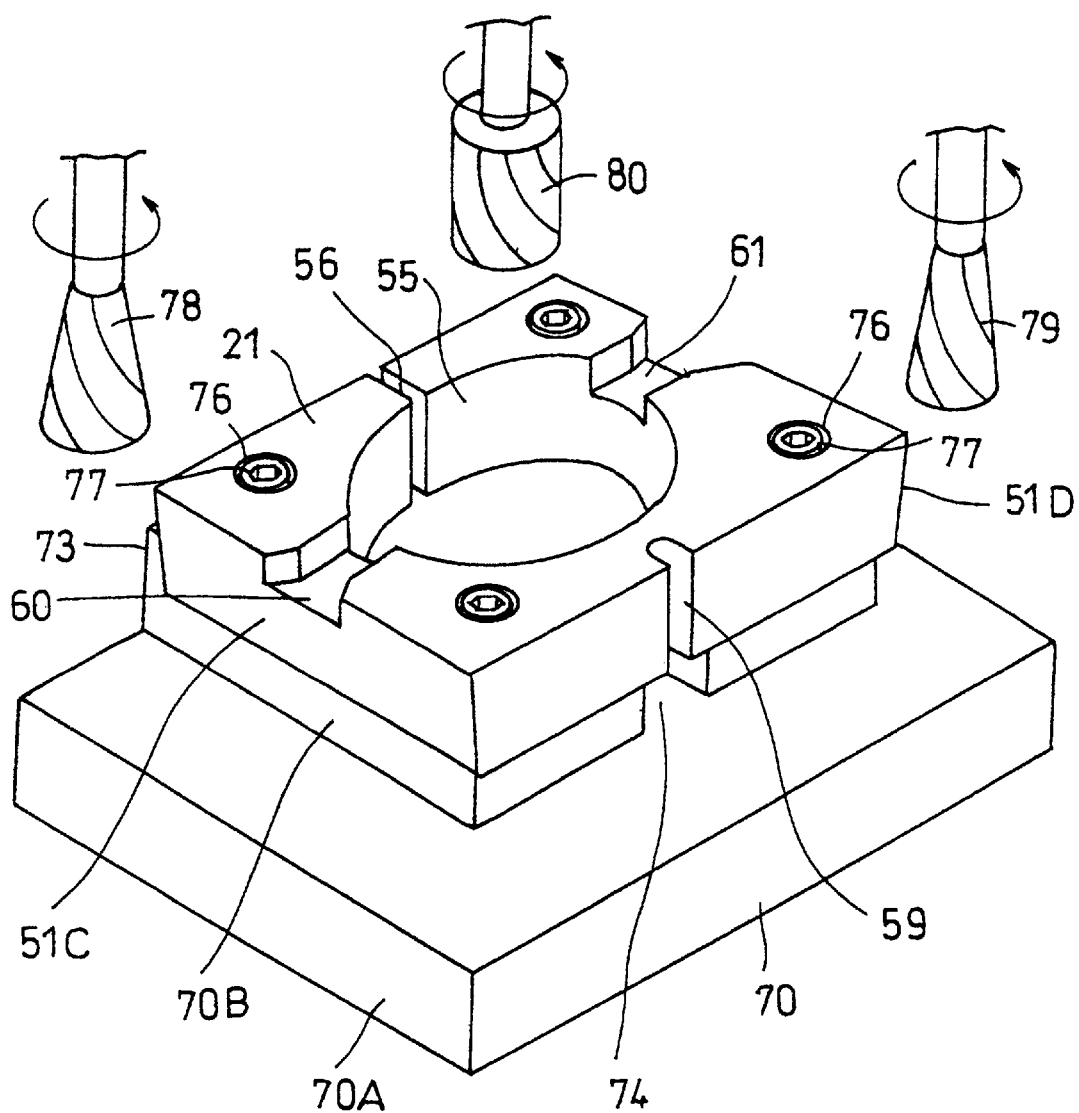

F I G. 2 3
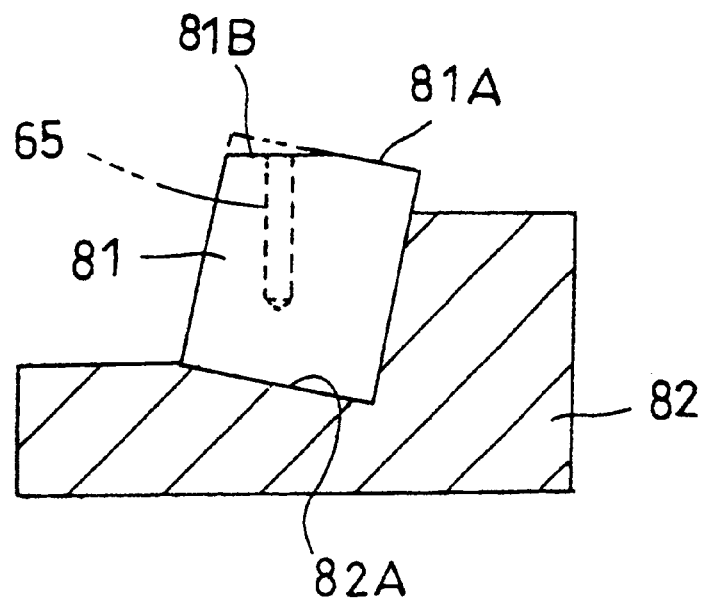
F I G. 2 4
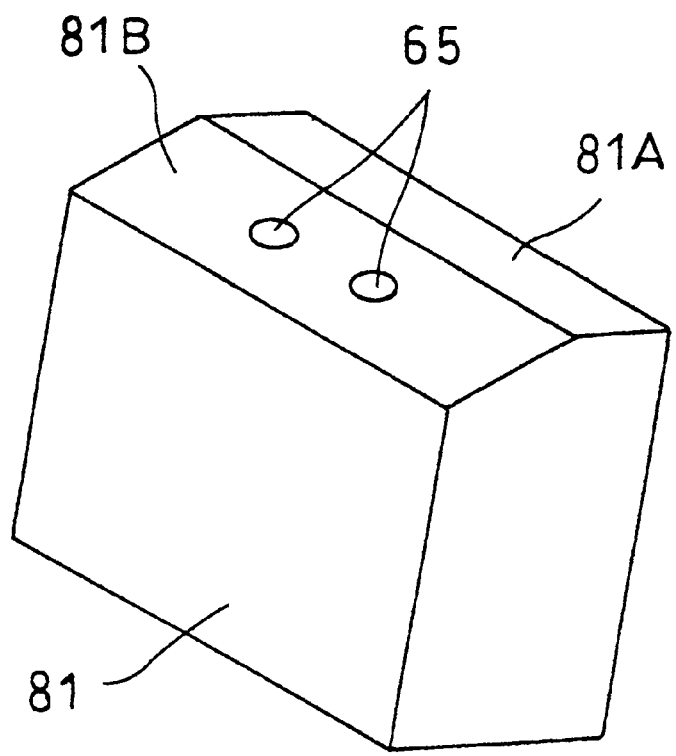

DRILL JIG FOR SPECTACLE LENS MANUFACTURE JIG THEREOF, METHOD OF DRILLING FOR SPECTACLE LENS, AND SPECTACLE LENS

TECHNICAL FIELD

The invention relates to a jig used for drilling a closed-end hole in an edged face of a spectacle lens to extend inside the spectacle lens, a manufacture jig for manufacturing the above jig, a method of drilling a closed-end hole, extending inside a lens, in an edged face of a spectacle lens, and a spectacle lens, which are used in fabricating rimless spectacles of a combined type of the frame-component and lenses by means of which a lug portion, formed on the frame-component such as a bridge and an end piece, is inserted and secured into the closed-end hole formed in the edged face of the lens.

BACKGROUND ART

Japanese Patent Laid-open No. Hei7-230062 is known as a new type rimless spectacles. The rimless spectacles have pairs of lug portions on a bridge for joining the right and left spectacle lenses and on an end piece for joining a temple to a spectacle lens, and pairs of closed-end holes, extending inside a lens, in edged faces of the spectacle lenses in correspondence to the positions of the bridge and the end piece. The spectacle lens is joined to the bridge and the end piece by inserting a pair of the lug portions into the closed-end holes and bonding with adhesive. According to the above description of rimless spectacles, compared to conventional rimless spectacles generally called a two-point type or a three-piece type, a screw piercing from the front face of a lens to the back face in the vicinity of an end of the lens is omitted, therefore obtaining the advantage of an expansion of the effective range of vision and the like.

Conventionally, to drill a closed-end hole in an edged face of a spectacle lens to extend inside the lens, after a guide member shaped as a small part which is provided with a pair of guide holes which guide a drill as a drilling instrument of a drill press, is attached on an edged face of a lens with a double-sided adhesive tape, a technician holds the spectacle lens with his/her hand, and then inserts the drills into the respective guide holes of the guide member in sequence, to form the closed-end holes on the edged face of the lens with the guiding action of the guide hole.

However, the drilling process of the closed-end hole is carried out while the technician is holding the spectacle lens with his/her hand, so that the holding of the spectacle lens is not stable, and naturally, the spectacle lens is not stable with respect to the drill, thus experience is required to drill the closed-end hole with accuracy. Since the number of spectacle lenses in which the closed-end holes can be formed in a fixed hour period is limited, there is the disadvantage of the increase in production cost. Additionally, the spectacle lens and, the bridge and the end-piece as components of spectacle frames which have lug portions in pairs easily have a manufacture error or a finishing error. Therefore, the drilling operation for the spectacle lens has to be carried out while taking such errors into account, so that a lot of time, experience and skill are required for the drilling operation.

It is an object of the present invention to provide a drilling jig for a spectacle lens which is capable of drilling a closed-end hole in an edged face of the spectacle lens with accuracy without experience, and increasing the number of spectacle lenses in which the closed-end holes are formed in a fixed time period.

It is another object of the present invention to provide a jig for effortlessly manufacturing the drilling jig.

It is still another object of the present invention to provide a method of drilling a spectacle lens which is capable of performing the precise drilling operation with respect to rimless spectacles of which closed-end holes are formed in the edged faces of the lenses for insertion of the holding members of spectacle-frames, and the resulting spectacle lens.

DISCLOSURE OF THE INVENTION

A drill jig for a spectacle lens according to the present invention is characterized by including a holding portion which retains a meniscus edged spectacle lens; and a guide portion which guides a drilling instrument for opening a closed-end hole, extending inside the lens, in an edged face of the spectacle lens.

According to the drill jig, since the spectacle lens is retained by the holding portion of the jig in a motionless state, an operator does not need to hold the spectacle lens itself with a hand. The processes are simplified due to the fact that the drilling operation is carried out by holding the jig with his/her hands. Additionally, since the jig is provided with the guide portion guiding the drilling instrument for drilling the closed-end holes in the edged face of the spectacle lens, the drilling operation is performed on the spectacle lens in the motionless state with precision. As a result, an accurate drilling operation without special skill is provided, and the number of spectacle lenses in which the closed-end holes are formed in a fixed hour can be increased as compared with conventional art.

The holding portion may retain the spectacle lens by force acting on an edged face as the circumferential face of the spectacle lens toward the inside of the lens, or alternatively the holding portion can retains the spectacle lens on the front face and the back face as a convex face and a concave face of the spectacle lens. The former case is preferable in order to prevent the optical face of the lens from damage.

When the holding portion is structured as described above to retain the spectacle lens by the force acting on the edged face of the spectacle lens toward the inside of the lens, the jig is provided with a plurality of support portions each of which is inclined with respect to a direction of the holding force and supports the spectacle lens. During formation, the holding force of the holding portion can act on the spectacle lens while the support portions support the spectacle lens, so that the spectacle lens is provided in the positioning state with respect to the drilling instrument guided by the guide portion to drill into the edged face of the spectacle lens.

The support portion may supports a lens corner that is formed by the edged face and an optical surface as the front face or the back face of the spectacle lens, or alternatively, the support portion can supports the front face or the back face of the spectacle lens. The front face and the back face of the spectacle lens, however, are very important parts for a spectacle lens, so that the former case is advisable.

In the drill jig according to the present invention, the support portion may be unitedly formed with the jig itself. Alternatively, the drill jig is composed of a jig body; and a plurality of support members attached to the jig body, in which the holding portion is formed in the jig body, and the support portion may be provided in the support member. In the latter, an advantage in that the jig body and the support member are respectively formed of different materials appropriate for respective functions is obtained.

Where a plurality of the support portions are formed in a plurality of the support members, the guide portion can be provided in at least one of the support members. In the formation, the support portion and the guide portion are provided in the support member, resulting in simplification of the formation of the jig body and reduction of the number of parts.

Where the guide portion is formed in the support member, a space may be formed between an end of the guide portion and the edged face of the spectacle lens. According to the formation, when the closed-end hole is formed in the edged face of the spectacle lens by the drilling instrument, cuttings produced in processing can be removal by an cuttings remove means having an air ejecting nozzle or an opening for air intake. Where the drill jig is put on the bed of the drill press and the drilling operation is carried out, a disadvantage of the displacement of the drill jig which is caused by the cuttings on the bed can be solved.

In order to retain the spectacle lens by the drill jig, the drill jig can be composed of a plurality of members capable of being opened and closed by an elastic member, such as a spring, in a direction that retains the spectacle lens, and the faces of the above members which confront the spectacle lens can serve as the holding portion retaining the spectacle lens. For simplification of the formation, an opening formed into a through-hole shape corresponding to a lens shape is formed in the jig body of the drill jig, and the opening is defined as the holding portion retaining the spectacle lens. Additionally, the jig body may be provided with a slit that is formed from the exterior face of the jig body to the opening, and an elastic member having an elastic tightening force acting in a direction that contracts a width of the slit, which is for tight retaining the spectacle lens, fitted in the opening, inside the opening. Thereby achieving the simplification of formation and the reduction of parts.

Where the slit reaching the opening is formed in the jig body as described above, a notch portion may be formed at a position of the jig body opposing to the slit across the opening. In the formation, since the strength of the jig body can be smaller in the notch, the fitting operation of the spectacle lens into the opening is smoothly performed.

A side face of the drill jig according to the present invention which is opposite the drilling instrument side is an inclined face at an inclined angle to form a right angle with the guide portion.

Provided that the face of the jig which is opposite the drilling instrument is the inclined face perpendicular to the guide portion, when the closed-end hole is formed in the spectacle lens, retained in the jig, by a drilling instrument such as a drill of a drill press, the orientation of the drilling instrument and the orientation of the guide potion naturally meet by touching the inclined face of the jig to the bed of a processing device such as the drill press. Therefore, the drilling operation is performed while the jig is placed on the bed, and thus performed in the stable state of the jig.

The number of support portions provided in the drill jig to support the spectacle lens is optional, but it is advisable that the number of support portions is three when the closed-end hole is formed in the edged face of the spectacle lens for demonstration-use. In this point, each spectacle lens is stably supported by the three-point support with reliability.

It is advisable that the number of support portions is four when the closed-end hole is formed in each edged face of spectacle lenses having various shapes prescribed for patients. In this point, each of the spectacle lenses having various convex curves having a different lens diopter or the like is supported by the optional three points of the four support portions in conformance to the formed position of the closed-end hole by the drill jig.

The above three or four support portions can be unitedly formed in the jig or formed in the support member attached to the jig body.

Each one of the four support portions can be provided in each of the four support members, but it is desirable that two of the four support portions are assigned to each of the two support members arranged approximately opposite to each other with respect to the spectacle lens. During formation, the three-point support for stably supporting the spectacle lens can be achieved with a small number of support members. Moreover, each closed-end hole can be formed at approximately the same position in the lens-thickness direction by the drill jig.

A manufacture jig of a drill jig according to the present invention, which is used in manufacturing a drill jig for a spectacle lens which has an opening formed into an through-hole shape corresponding to a lens shape, and inclined faces positioned opposite a drilling instrument for forming a closed-end hole in an edged face of the spectacle lens to extend inside the lens, and forming a right angle with the drilling instrument, is characterized by including a protruded portion having a width smaller than a distance between the exterior face of the drill jig and the opening; and join portions connecting to fixtures for fixing the drill jig which is placed on the protruded portion positioned under and between the exterior face and the opening of the drill jig.

According to the manufacture of the jig, even though the drill jig has a complicated formation having the opening and the inclined faces, the drill jig is manufactured by being placed on the protruded portion having a width smaller than a distance between the external face of the drill jig and the opening, and fixed by the fixture, and thus itself is set in a floating state from a processing machine such as a machining center or a milling machine. In consequence, by using a cutting tool, such as an end mill having a circumferential face inclined at an angle in accordance with the aforementioned inclined side face and a normal end mill, in the processing machine, the drill jig is effortlessly manufactured in a short time.

A method of drilling a spectacle lens according to the present invention, in which a closed-end hole for inserting a component of spectacle frames is formed in an edged face of the spectacle lens to extend inside the lens, is characterized by the steps of: providing, in a drill jig retaining the spectacle lens, a support portion abutting an outer circumferential edge of the spectacle lens of which a convex face is oriented downward, and supporting the spectacle lens, and a guide portion guiding a drilling instrument for forming the closed-end hole; and forming the closed-end hole extending from the edged face of the spectacle lens inwardly thereof while the guide portion is guiding the drilling instrument.

According to the drilling method, since the spectacle lens is retained in the drill jig and supported by the support portion, an operator performs the drilling operation while holding the drill jig, resulting in the accurate drilling operation. The circumferential edge of the spectacle lens is supported on and abutted to the support portion while the convex face is oriented downward, and the convex face of the spectacle lens has a configuration simpler than that of the concave face from the view point of optical design of lens, so that the spectacle lens is supported with stability.

It is advisable that an opening formed in the drill jig to be passed therethrough retains the spectacle lens, and has eyebrow-side, cheek-side, nose-side and ear-side periphery portions in the vertical direction and the lateral direction of the spectacle lens, in which the support portion and the guide portion are disposed in each of the nose-side periphery portion and the ear-side periphery portion, and then the closed-end bole is formed in the spectacle lens, retained by the support portion, by the drilling instrument guided by the guide portion. According to the method, the closed-end hole is formed without damaging important parts of the spectacle lens.

When the drill jig is provided with a slit, extending from the exterior face of the drill jig to the opening, in at least one of the eyebrow-side and cheek-side periphery portions of the opening, and an elastic member changing a width of the slit by an elastic tightening force, the closed-end hole can be formed while the spectacle lens fitted in the opening is retained by the elastic tightening force caused by the elastic member. In the method, even if the spectacle lens with an edge-filing finish has a manufacturing error, the spectacle lens can be retained by the opening without any effect from the error.

The drill jig can be composed of a jig body having a holding portion retaining the spectacle lens, and a support member attached to the jig body and provided with the support portion. It is desirable that guide holes as the guide portion is formed in the support member, and the closed-end hole is formed while the drilling instrument is inserted into and guided by the guide hole extending toward an approximately middle point between a convex face and a concave face of the spectacle lens. Thereby, the closed-end hole is drilled at an approximate midpoint of a thickness of the spectacle lens in accordance with the plans, and additionally, the strength of the lens is ensured after the closed-end hole is formed.

Acceptably, the two support portions are provided in the support member, and a guide hole as the guide portion is formed at a position of the support member corresponding to a position within a thickness of the spectacle lens in the vicinity of the vertical axis of each support portion, and the closed-end hole is formed while the drilling instrument is inserted into and guided by the guide hole. According to the method, with any spectacle lens prescribed for a patient and having any convex curve in accordance with lens diopter or the like, each closed-end hole is properly formed at an approximate predetermined position within the lens-thickness by the two support portions having a pitch similar to that of the two closed-end holes.

Additionally, the support portions can be provided in two positions of a nose-side end portion and an ear-side end portion of the spectacle-lens holding portion formed in the jig body. The spectacle lens is supported by the two support portions of the support member located in the nose-side end portion and one of the two support portions of the support member located in the ear-side end portion when the closed-end hole is formed in the edged face of the spectacle lens positioned in the nose-side end portion, and the spectacle lens is supported by the two support portions of the support member located in the ear-side end portion and one of the two support portions of the support member located in the nose-side end portion when the closed-end hole is drilled in the edged face of the spectacle lens positioned in the ear-side end portion. According to the method, even the spectacle lens having any convex curve receives the three-point support by the three support portions, and each closed-end hole is formed at an approximate predetermined position within the lens-thickness.

When a pair of lug portions is formed in the component of the spectacle frames, and the two closed-end holes, into which the lug portions are respectively inserted, are formed in the edged face of the spectacle lens, a plurality of drilling instruments having cutting parts of various diameters are prepared. Thereby, a drilling instrument having the cutting part of a diameter appropriate for the pitch of a pair of the lug portions can be selected, and the closed-end holes may be formed by the selected drill instrument. Even when an error occurs in the pitch of a pair of the lug portions, the error is absorbed and a pair of the closed-end holes, into which the lug portions are properly inserted, is drilled.

Acceptably, with respect to the jig body retaining the spectacle lens, the support member, attached to the jig body and provided with the support portion and the guide portion, is provided to be moved toward and way from the spectacle lens; the guide portion of the support member, having the attaching position adjusted in the moving direction, guides the drilling instrument; and the drilling instrument is moved toward the spectacle lens until a stopper, attached in the drilling instrument, touches the support member, to drill the closed-end hole. The closed-end hole is formed to have a depth in correct accordance with a length of the lug portion to be inserted into the closed-end hole due to the setting of the attaching position of the stopper in the drilling instrument.

It is advisable that a side face opposite to the guide portion of the drill jig is an inclined face perpendicular to the guide portion; the inclined face is oriented on a horizontal bed of a processing device having the drilling instrument; and the closed-end hole is drilled by guiding the drilling instrument, having a moving direction of the vertical direction, by the guide portion. The predetermined closed-end hole is formed in the spectacle lens, retained in the drill jig, by the drilling instrument moving in the vertical direction, and also the forming of a closed-end hole inclined with respect to the edged face of the lens is allowed.

In the present invention as described hereinbefore, the drilling instrument for drilling the closed-end hole in the edged face of the spectacle lens may be the drill, but a tap for screw cutting can be used where the closed-end hole is formed as a female screw hole.

The spectacle lens of the present invention is mainly made of plastic, but may be made of glass. Where the spectacle lens is made of plastic, a selective material such as a polyurethane type, an allyl type, and an acrylic type can be used.

The main body of the drill jig may be made of plastic, wood, or metal, but a plastic material and a wood material are preferable from the viewpoint of no damage to the spectacle lens. Using a plastic material, it is preferable to use a polyacetal type resin having low risk of damage to the spectacle lens, appropriate hardness, and easiness of processing.

Moreover, the preferable rimless spectacles applying the present invention is the spectacles disclosed in Japan Patent Laid-open No. Hei7-230026, and preferably, a thickness of an edged face of a lens is more than about 2.4 mm if the lens is a polyurethane type lens. Due to the above thickness, the drilling of the closed-end hole is effectively performed, and the hold strength of the spectacle lens with respect to the component of spectacle frames can be sufficiently increased. Preferably, the drilling of the closed-end hole is performed to be along the convex face or the concave face of the spectacle lens, for example, the closed-end hole is formed at an angle inclined 10 degrees to 15 degrees from a perpendicular direction with respect to the edged face of the lens.

BRIEF DESCRIPTION OF DRAWINGS

FIG. 12 is an enlarged perspective view of the support member used in the jig in FIG. 10;

FIG. 13 is a sectional view of the support member used in the jig in FIG. 10;

FIG. 16 is a sectional view of a support member used when the spectacle lens has a small thickness;

FIG. 17 is a sectional view of a support member used when the spectacle lens has a medium thickness;

FIG. 18 is a sectional view of a support member used for the spectacle lens having a large thickness;

FIG. 22 is a perspective view showing a manufacturing operation of the jig body of the drilling jig with the manufacture jig in FIG. 21;

FIG. 23 shows the jig in section and is a side elevational view showing a first step when the support member is formed of a material;

FIG. 24 is a perspective view showing the entire material which is formed through the manufacture operation in FIG. 23.

BEST MODE FOR CARRYING OUT THE INVENTION

The present invention will be described hereinafter in further detail with reference to the accompanying drawings.

Figure 1:
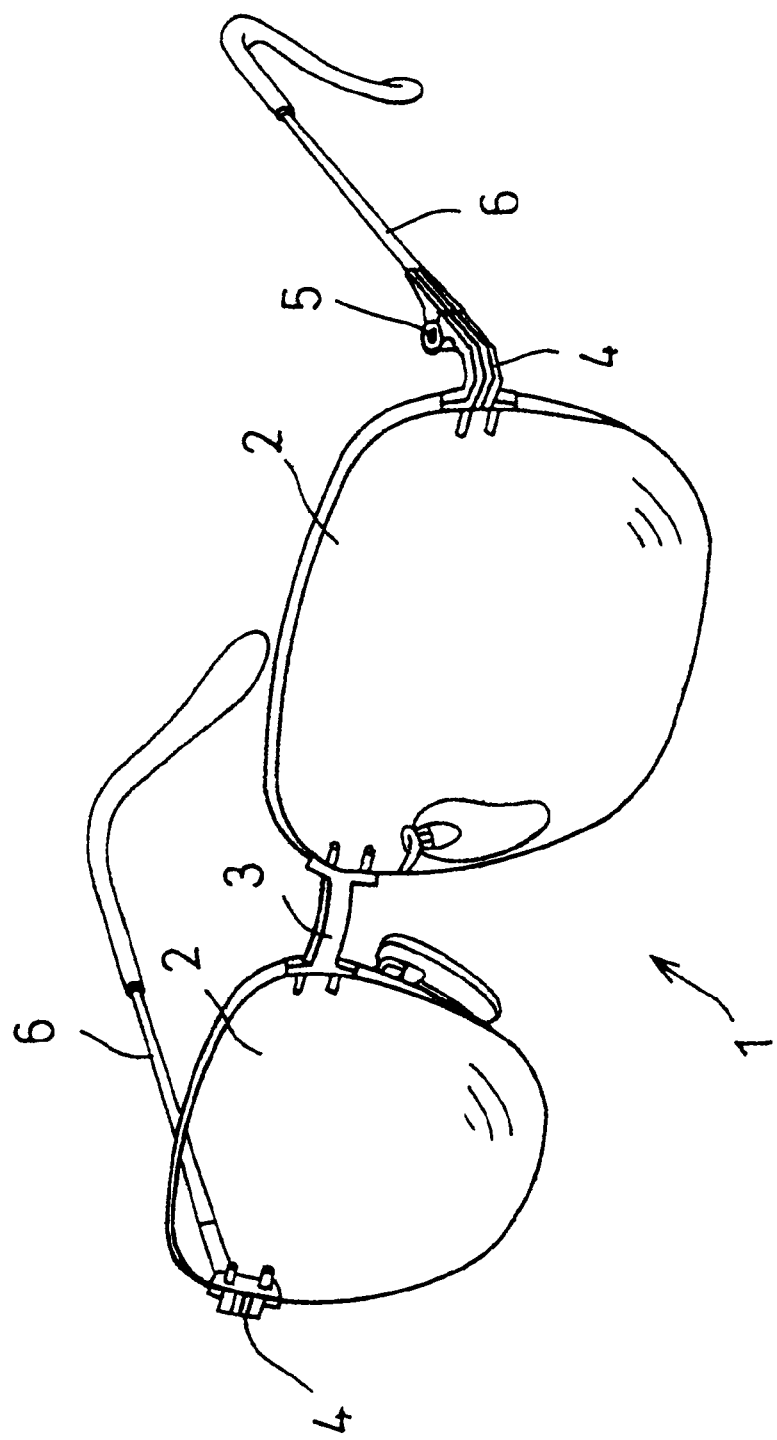
FIG. 1 is a perspective view showing entire spectacles in which closed-end holes are formed in edged faces of right and left spectacle lenses.
Figure 2:
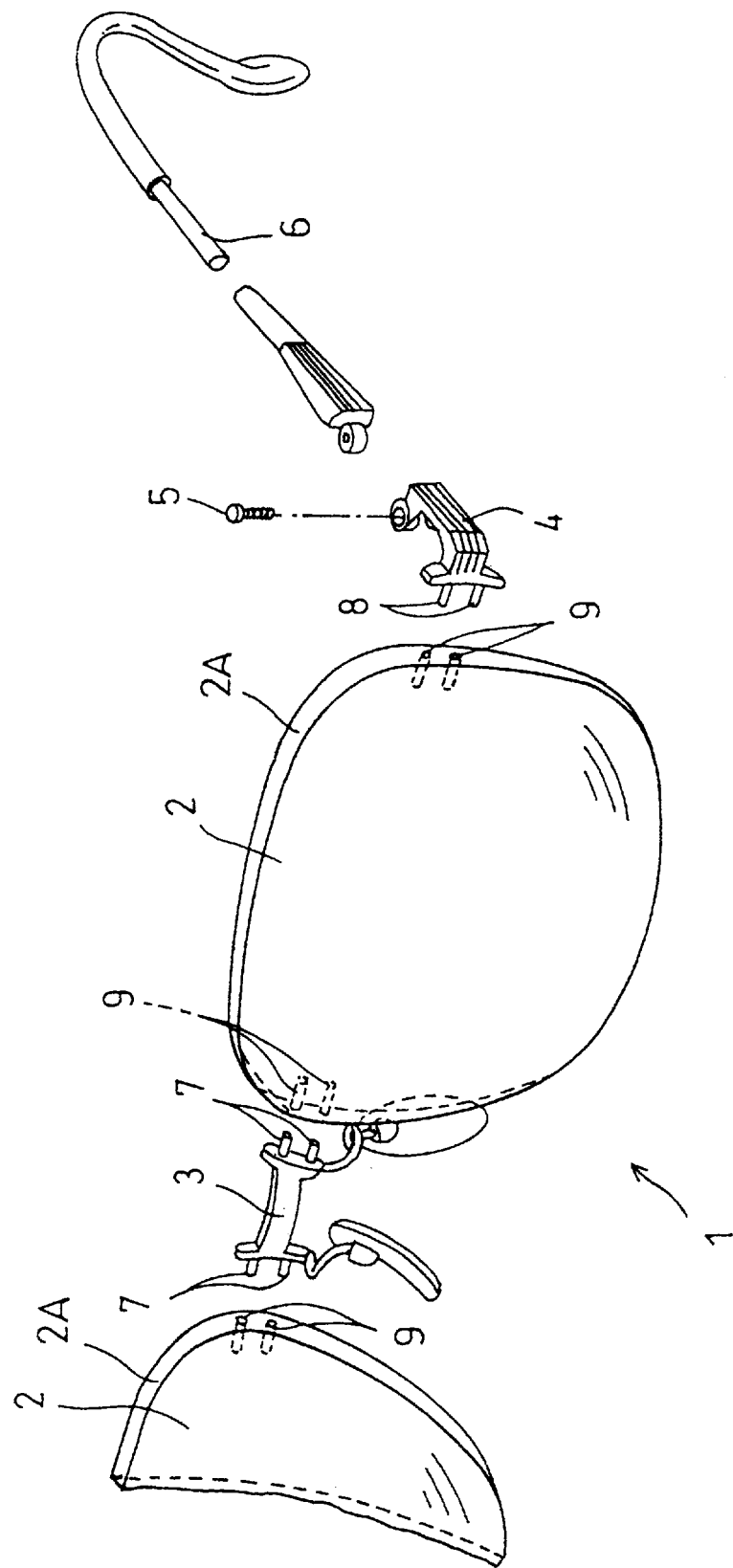
FIG. 2 is a perspective view showing a disassembled state of the spectacles in FIG. 1.

FIG. 1 shows rimless spectacles 1 having right and left meniscus type spectacle-lenses provided with closed-end holes. The frames of the rimless spectacles 1 is composed of a bridge 3 connecting the right and left spectacle lenses 2; an end piece 4 combined with each spectacle lens 2; and a temple 6 connected to each end piece 4 by a screw 5. As shown in FIG. 2, a pair of pin-shaped lug portions 7 is formed on each end portion of the bridge 3 as a frame-component, and a pair of lug portions 8 is also formed on each end piece 4. In a nose-side end portion and an ear-side end portion of an edged face 2A as the circumferential face of the spectacle lens 2, a pair of closed-end holes 9, which correspond to each of the lug portions 7 and 8 of the bridge 3 and the end piece 4 and extend inside the lens, is formed to be inclined at a predetermined angle with respect to the lens edged face 2A (see Japanese Patent Laid-open No. Hei7-230062). The lug portion 7 of the bridge 3 is inserted into the closed-end hole 9 of the nose-side end portion, and the lug portion 8 of the end piece 4 is inserted into the closed-end hole 9 of the ear-side end portion. Each closed-end hole 9 is formed in a size having a slightly longer length and diameter than those of each of the lug portions 7 and 8. Adhesive is injected into the closed-end hole 9 or coated onto the lug portions 7 and 8 in advance. Therefore, the bridge 3 and the end piece 4 are coupled to the spectacle lens 2 through the lug portions 7 and 8 and adhesive.

Figure 3:
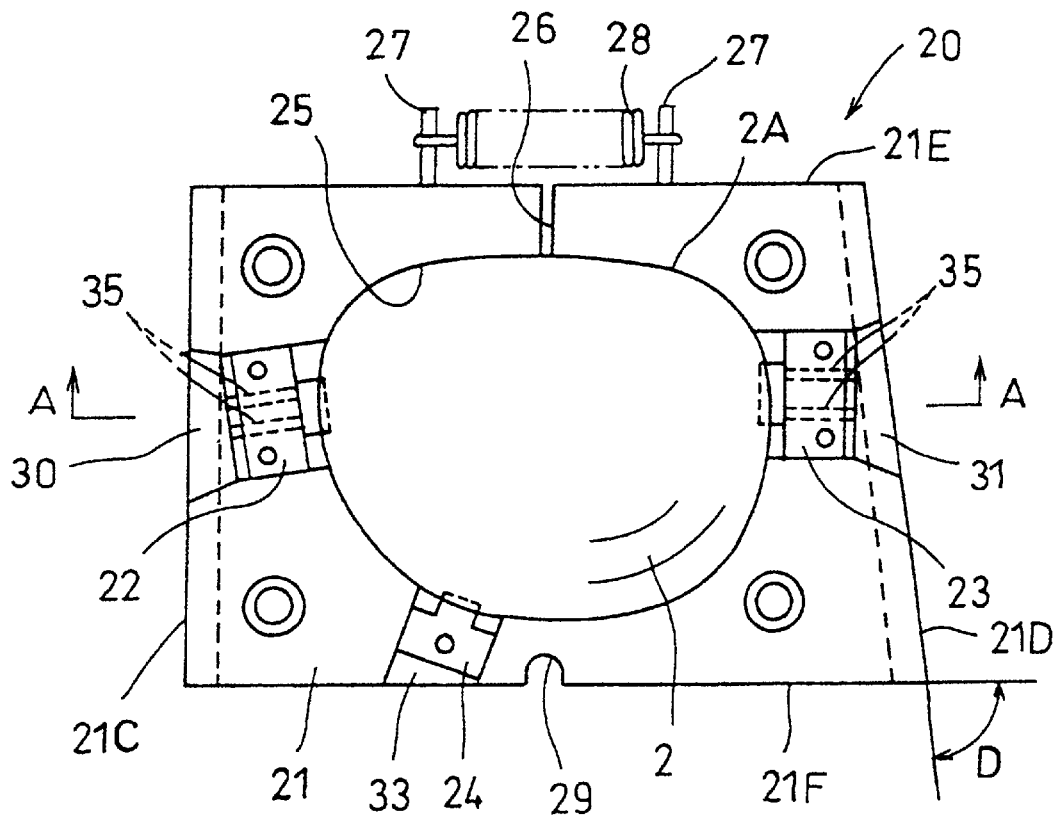
FIG. 3 is a plane view of a drilling jig used in drilling a closed-end hole in an edged face of a spectacle lens for demonstration-use.
Figure 4:
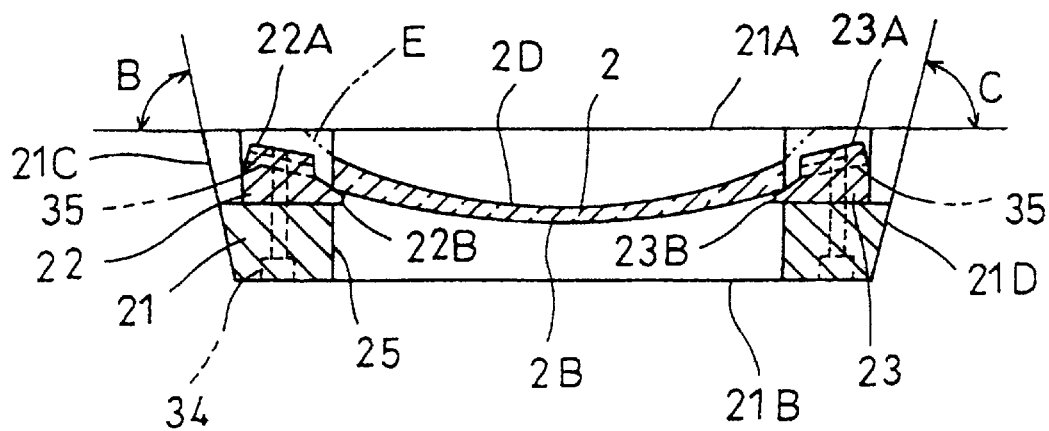
FIG. 4 is a sectional view taken along the A—A line in FIG. 3.

FIG. 3 shows a drilling jig 20 used when the closed-end hole 9 is drilled in the spectacle lens 2 of the rimless spectacles 1 as shown in FIG. 1. FIG. 4 is a sectional view taken along the A—A line in FIG. 3. A preferred usage example of the drilling jig 20 is the case where the closed-end hole 9 is drilled in an acrylic plastic lens for demonstration-use which has lens-diopter 0.00 (D) and is used as a sample instead of a prescribed lens. In other words, the drilling jig 20 is preferably used for forming a closed-end hole in a spectacle lens for demonstration-use, for example, used in a showcase display in a shop, but not as a prescribed spectacle lens for a patient. The drilling jig 20 is composed of a jig body 21 and three support members 22 to 24 which have support portions supporting the spectacle lens 2. The jig body 21 is made of a plastic of a polyacetal resin which has superior cut-operability and harmlessness against an optical surface. The support members 22 to 24 are made of a metal such as iron or brass.

Figure 5:
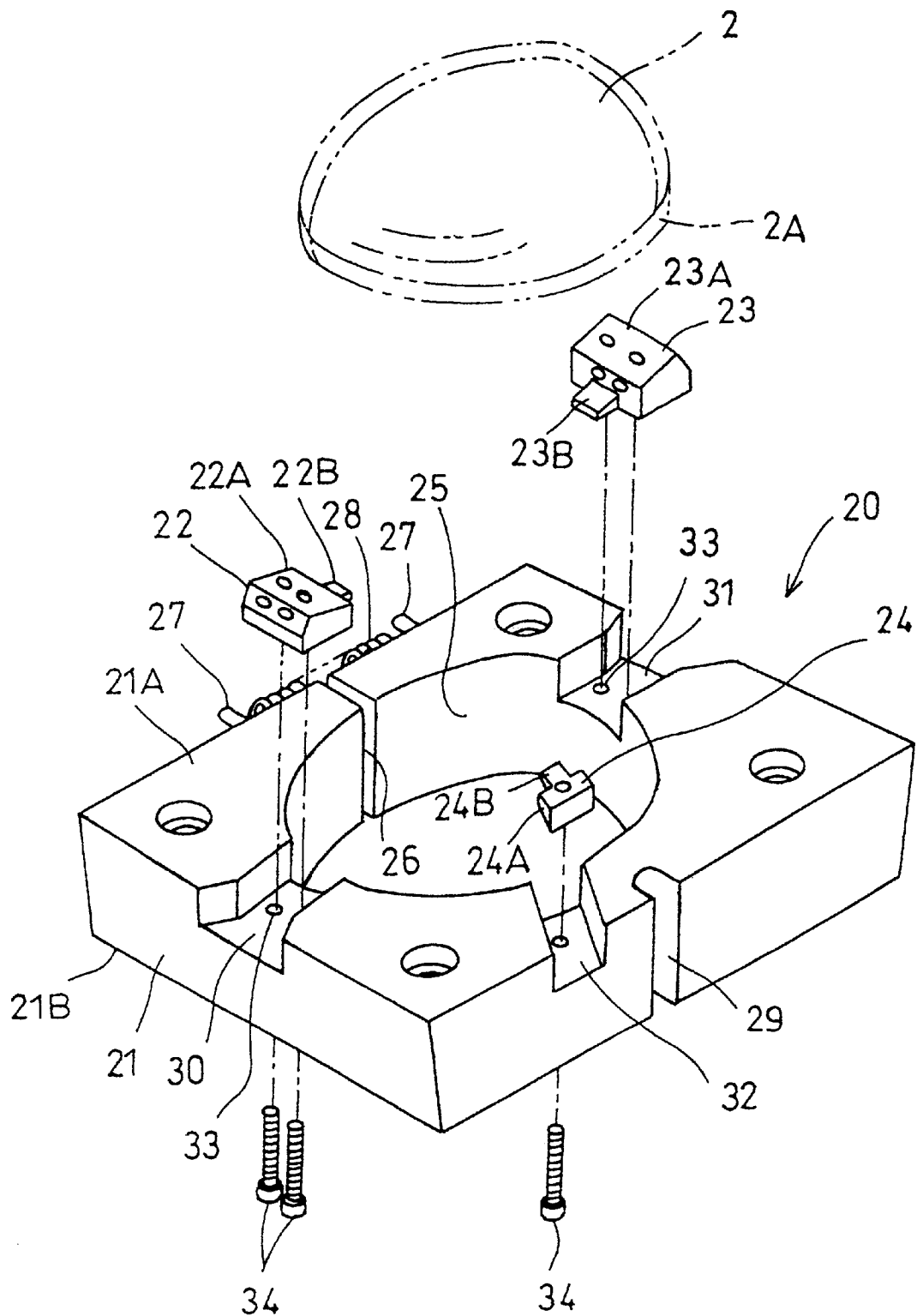
FIG. 5 is a perspectively exploded view of the jig in FIG. 3.

As shown in FIG. 5, the jig body 21 is formed into a thick block shape, and at the central portion thereof, an opening 25 is formed to pierce between a top face 21A and an under face 21B. Since the opening 25 has a shape corresponding to a lens shape of the spectacle lens 2, the spectacle lens 2 can be fitted into the opening 25. When a convex face 2B of the spectacle lens 2 points downward, the right and left spectacle lenses 2 differ in a lens shape from each other. Additionally, the spectacle lens 2 has various lens shapes. Therefore, the jig 20 is provided according to a right side lens, a left side lens and any lens having various lens shapes.

Regarding the jig body 21, in an eyebrow-side periphery portion of the opening 25 fitted therein with the spectacle lens 2, a slit 26 is formed from the exterior face of the jig body 21 to the opening 25. Near either side of the slit 26, the ends of a spring 28 as an elastic member are respectively engaged with two pins 27 standing up on the jig body 21. Thereby, the opening 25 can be slightly opened and closed by expanding and contracting the slit 26, and additionally, the spectacle lens 2 is forcibly pressed into the opening 25, and thus can be fitted into the opening 25 which is pulling open against the spring 28. A spring force of the spring 28, acting in the direction that contracts a width of the slit 26, changes into a force directing from the edged face 2A of the spectacle lens 2 toward the inside of the lens, and acts on the opening 25. In consequence, the opening 25 results in a holding portion which retains the spectacle lens 2, so that the spectacle lens 2 is tightly retained in the inside of the opening 25.

On the jig body 21, from the slit 26 on the opposite side of the opening 25, namely, outside the cheek-side periphery portion of the opening 25, a notch 29 is formed, so that the strength of the jig body 21 is lower in this area, resulting in a smooth operation of fitting the spectacle lens 2 into the opening 25. Moreover, even when the lens shape of the spectacle lens 2 has a finishing error or a manufacturing error, the shape changeability of the opening 25 due to the slit 26 and the notch 29 absorbs the errors, so that the spectacle lens 2 is properly fitted into the opening 25.

In the positions on the periphery of the opening 25 which correspond to the nose-side end portion (the bridge 3 side of the frames), the ear-side end portion (the end piece 4 side of the frames), and the lower end portion of the spectacle lens 2 placed on the top face 21A of the jig body 21, slots 30 to 32 are respectively formed to extend from the exterior face jig body 21 to the opening 25. The aforementioned support members 22 to 24 are respectively accommodated in the slots 30 to 32, and attached to the jig body 21 by bolts 34 each of which is inserted from the under face 21B into a bolt hole 33 formed in the jig body 21. The support members 22 to 24 respectively have primary portions 22A to 24A and secondary portions 22B to 24B which extend in a tongue shape from the primary portions 22A to 24A to opening 25 to be a support portion which supports the spectacle lens 2. The secondary portions 22B to 24B project inside the opening 25.

As shown in FIG. 4, in the primary portions 22A and 23A of the support members 22 and 23 which are respectively located at positions corresponding to the nose-side end portion and the ear-side end portion of the spectacle lens 2 in the jig body 21, guide holes 35 are formed respectively. As is clear from FIG. 3, the guide holes 35 are formed as a pair in each of the support members 22 and 23. The guide hole 35 is a guide portion which guides a drill 37 as a drilling instrument of a drill press 36, shown in FIG. 6, for drilling the closed-end hole 9 in the spectacle lens 2.

The guide hole 35 is formed to guide the drill 37 in the correct direction with respect to the edged face 2A of the spectacle lens 2. More specifically, as shown in FIG. 4, the guide hole 35 has an inclined angle from the top face 21A side toward the under face 21B side of the jig body 21 along the extending direction from the exterior face of the jig body 21 toward the opening 25, in relation to a held condition of the spectacle lens 2 with respect to the jig body 21 when the spectacle lens 2 is supported by the secondary portions 22B to 24B of the receive members 22 to 24, and a curved shape of the spectacle lens 2. The extending direction of the guide hole is routed to an approximate midpoint between the convex face 2B and a concave face 2D of the spectacle lens 2 which is supported by the support members 22 to 24 to be fitted and retained in the opening 25. Therefore, when the drilling of the closed-end hole 9 is performed by inserting and guiding the drill 37 into the guide hole 35, the closed-end hole 9 is formed in the central portion of the thickness of the spectacle lens 2, so that the high strength of lens can be obtained.

A side face 21C found opposite of the support member 23 in the jig body 21 is inclined at an angle B with respect to the parallel top and under faces 21A and 21B of the jig body 21 so that the angle B is equal to an angle that the side face 21C and the guide hole 35 of the support member 23 form a right angle. A side face 21D found opposite the support member 22 in the jig body 21 is inclined at an angle C with respect to the top face 21A and the under face 21B so that the angle C is an angle at which the side face 21D and the guide hole 35 of the support member 22 form a right angle.

As shown in FIG. 3, since the guide hole 35 of the support member 22 is also inclined with respect to parallel front and back faces 21E and 21F of the jig body 21, the side face 21D of the jig body 21 has an inclined angle D with respect to the front face 21E and the back face 21F so that the angle D is an angle at which the side face 21D and the guide hole 35 of the support member 22 form a right angle.

Figure 7:
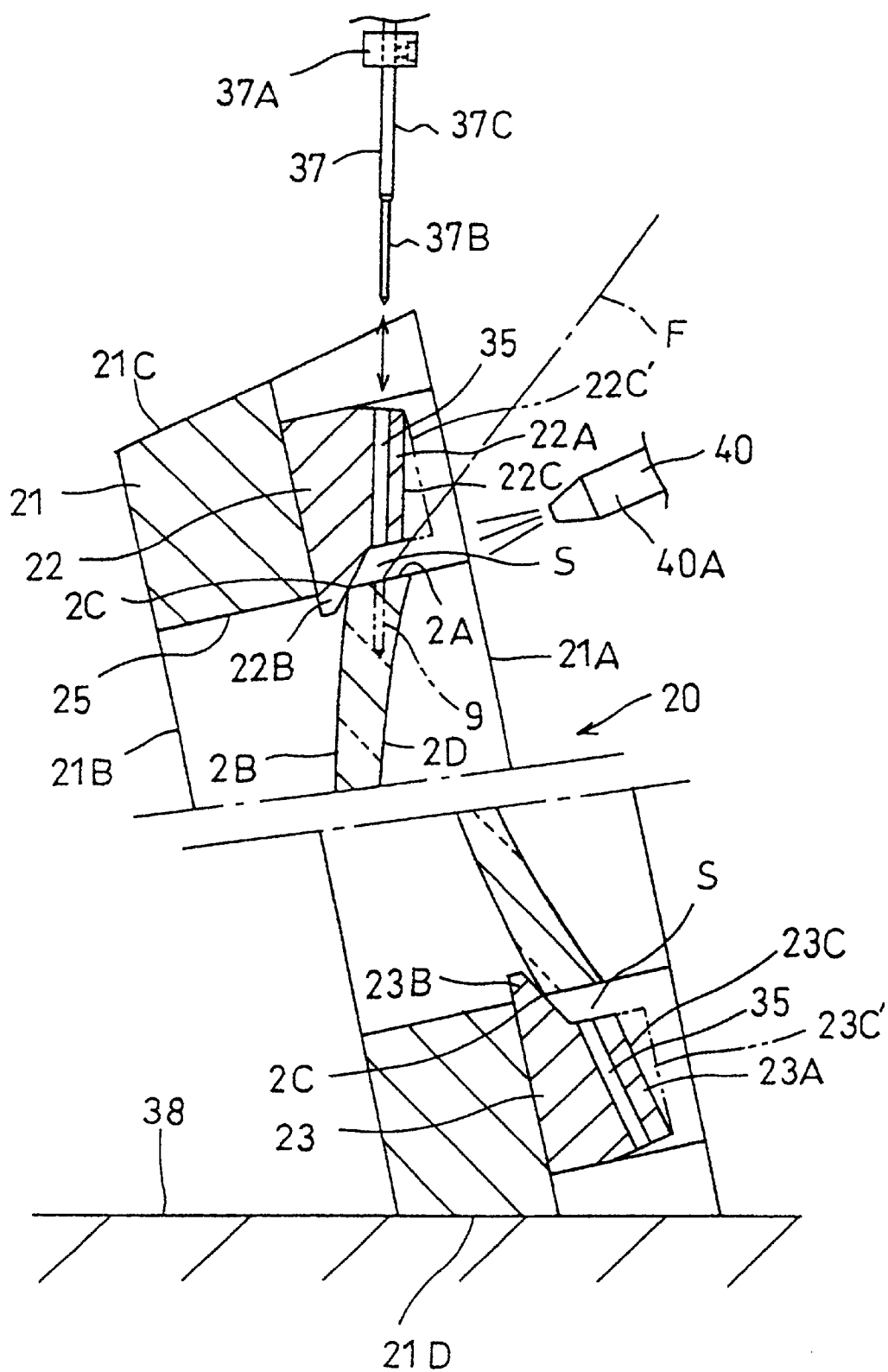
FIG. 7 is a fragmentary sectional view showing a situation in that the closed-end hole is drilled in the spectacle lens, held by the jig in FIG. 3, by the drill press in FIG. 6.

The secondary portions 22B to 24B of the support members 22 to 24 are inclined from the top face 21A of the jig body 21 toward the under face 21B along the direction of extending from respective primary portions 22A to 24A toward the opening 25. The inclined angle is larger than that on the convex face 2B in the vicinity of the edged face 2A of the spectacle lens 2. Therefore, as shown in FIG. 7, when the secondary portions 22B to 24B support the spectacle lens 2, a lens corner 2C as a lens circumferential edge, which is formed by the edged face 2A and the convex face 2B as the optical surface of the spectacle lens 2, gets in contact with the secondary portions 22B to 24B. Accordingly, with limited contact of the secondary portions 22B to 24B with the convex face 2B and the concave face 2D as the optical faces of the spectacle lens 2, the spectacle lens 2 having a three-dimensional curved configuration is stably supported at three points by the three support members 22 to 24.

Each length, extending toward the opening 25, of the primary portions 22A and 23A of the support members 22 and 23 does not reach the edged face 2A of the spectacle lens 2, so that when the spectacle lens 2 is supported on the secondary portions 22B to 24B, a space S shown in FIG. 7 is formed between the edged face 2A and each end of the guide holes 35 formed inside the primary portions 22A and 23A. Thereby, as will be described hereinafter, in the drilling operation for the spectacle lens 2 by the drill 37 of the drill press 36, effects of reliably discharging of cuttings and the like can be obtained.

The operation of forming the closed-end hole 9 in the spectacle lens 2 using the drilling jig 20 is performed as follows: The spectacle lens 2 is put onto the opening 25 from the top face 21A of the jig body 21 so that the convex face 2B points downward, and is forcibly pressed toward the inside of the jig body 21, whereby the slit 26 is slightly expanded against the spring 28 so that the spectacle lens 2 is fitted into the inside of the opening 25. The lens corners 2C of the spectacle lens 2 are supported on the secondary portions 22B to 24B of the support members 22 to 24, and additionally, the spectacle lens 2 is retained by the holding force of the opening 25 which acts from the edged face 2A of the spectacle lens 2 toward the inside of the lens by the spring 28. Thereby, the spectacle lens 2 is retained in a motionless state in the jig 20 while being placed in a positioning state due to the three-point support on the convex face 2B of the spectacle lens 2 by the secondary portions 22B to 24B of the support members 22 to 24 which form angles with a direction of the holding force caused by the spring 28.

In the operation, since the notch 29 is formed opposite the slit 26 across the opening 25 in the jig body 21, the amount of the opening 25 opening by the expansion of the slit 26 can be increased, so that the pressing of the spectacle lens 2 into the opening 25 can be effortlessly carried out.

Note that in order to perform the further smoothly pressing of the spectacle lens 2 into the opening 25, as illustrated with a phantom line E in FIG. 4, a tapered guide face sloping toward the opening 25 can be provided on the top face 21A of the jig body 21.

When the spectacle lens 2 is fitted and retained in the opening 25 of the jig body 21, the positions of the spectacle lens 2 which are received by the secondary portions 22B to 24B of the support members 22 to 24 are the lens corners 2C, so that the optical faces such as the convex face 2B as the lens front face and the concave face 2D as the lens rear face are not damaged.

Figure 6:
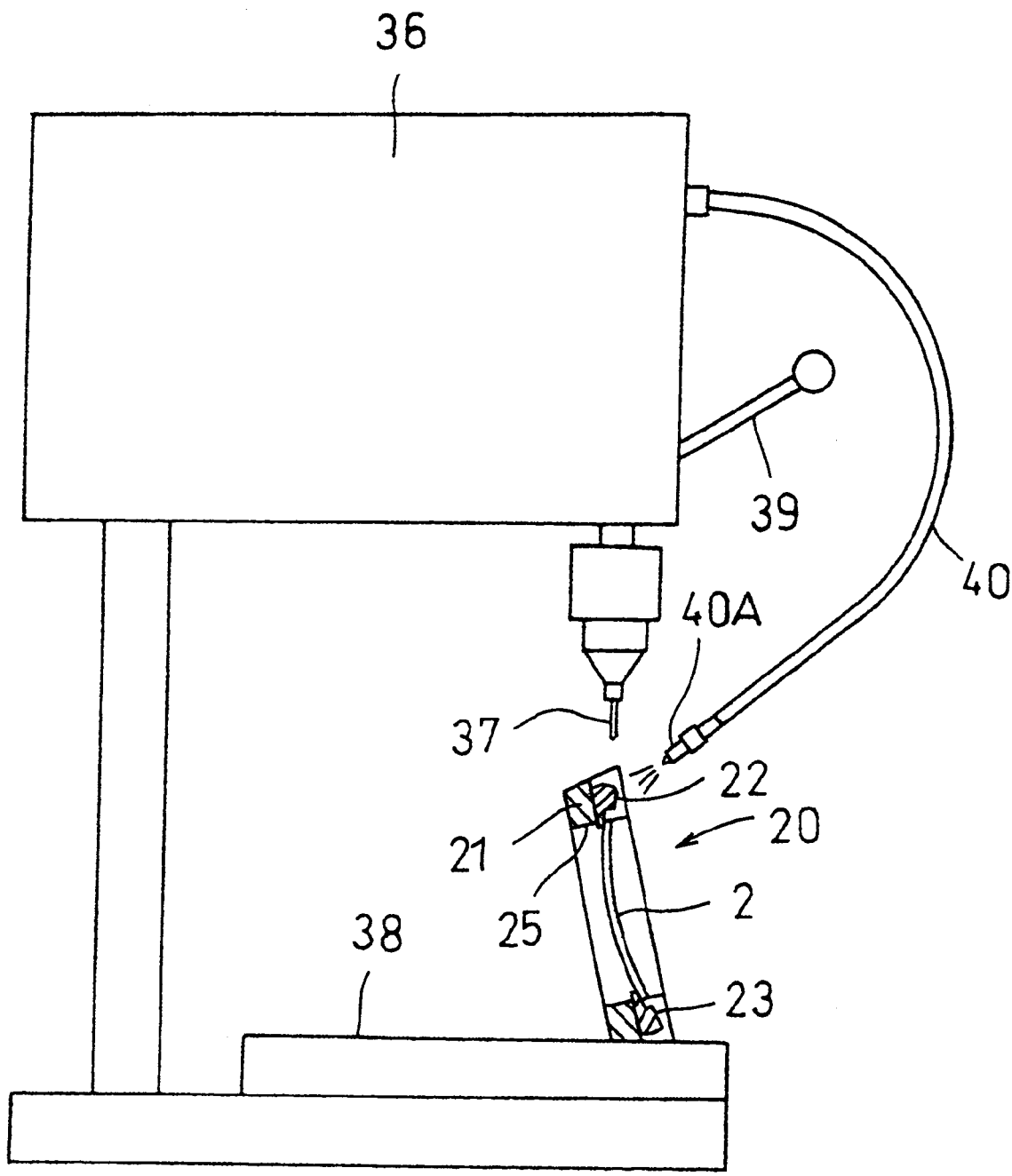
FIG. 6 is a side elevational view of a drill press used for forming the closed-end hole in the edged face of the spectacle lens.

As described thus far, when the closed-end hole 9 is formed in the spectacle lens 2 which is retained in the jig 20, the jig 20 is set on a horizontal bed 38 of the drill press 36 as shown in FIG. 6. Where the drilling operation by the drill 37 is performed using the guides 35 of the support member 22 of the two support members 22 and 23, as shown in FIG. 7, the setting process is carried out so that the side face 21D of the jig body 21 which is opposite the support member 22 is placed on the bed 38. Thereby, an operator can hold the jig body 21 stably. Additionally, the orientation of the guide holes 35 of the support member 22 can correspond to the vertical direction as a moving direction of the drill 37 due to the angles C and D shown in FIGS. 3 and 4.

Continuously, the operator keeps hold of the jig body 21 with one hand and operates a lever for vertically traveling drill 39 of the drill press 36, shown in FIG. 6, with the other hand so that the drill 37 is moved down, to be inserted into the guide hole 35 of the support member 22. Thereby, the drill 37 is moved down to the edged face 2A of the spectacle lens 2 by the guide action of the guide hole 35, and further moved down until a stopper 37A attached in the drill 37, shown in FIG. 7, abuts to the support member 22, thereby forming the closed-end hole 9 in the spectacle lens 2. After the stopper 37A abuts to the support member 22, the drill 37 cannot be moved down further, so that the depth of the closed-end hole 9 is related to an attached position of the stopper 37A in the drill 37. The aforementioned drilling operation is performed on each guide hole 35 formed in a pair in the support members 22. After that, the jig body 21 is turned upside down to perform the drilling operation on the guide holes 35 in the support member 23.

The drill 37 is a pivot drill and has a cutting part 37B and a shank part 37C. The pivot drill 37 has a shape corresponding to those of the lug portion 7 of the bridge 3 and the lug portion 8 of the end piece 4, while having a diameter and length longer than those of the lug portions 7 and 8. Various types of the pivot drill 37, in which the cutting parts 37B have various diameters but the shank part 37C has the same diameter, are prepared. The hole diameter of each guide hole 35 of the support members 22 and 23 has dimensions corresponding to the diameter of the shank part 37C of the various types of pivot drills 37 which is to be inserted into the guide hole 35. As a consequence, by appropriately selecting the drill 37 used, in accordance with the plans, closed-end holes 9 that are respectively proper for sizes of the lug portions 7 of the bridges 3 and the lug portions 8 of the end pieces 4 can be respectively formed in the edged faces 2A of the spectacle lenses 2. Moreover, even where a pair of the lug portions 7 of the bridge 3 or a pair of the lug portions 8 of the end piece 4 has a pitch error caused by a manufacturing error, the diameter of the closed-end hole 9 can be changed by selecting the cutting part 37B of the drill 37. Thereby, the pitch error in a pair of the lug portions 7 or a pair of the lug portions 8 can be absorbed.

In the aforementioned drilling operation, a nozzle 40A of an air ejector 40 as a cuttings removal means which is provided in the drill press 36 is pointed toward the space S between the end of the guide hole 35 and the edged face 2A of the spectacle lens 2 as shown in FIG. 7. Therefore, the cuttings produced in drilling the closed-end hole 9 are blown by air ejected from the nozzle 40A, so that the cuttings do not spread over the bed 38 of the drill press 36, or adhere to the support member of the drilling jig 20 in the next drilling operation, or remain in the closed-end hole 9. As a result, since a displacement of the drilling jig 20 on the bed 38 by the cuttings and the like are avoided and an improvement in workability is obtained, the closed-end hole 9 having a fixed depth can be reliably formed in the spectacle lens 2 by moving the drill 37 down until the stopper 37A reaches the support member 22 or 23.

In the embodiment, faces 22C and 23C of the primary portions 22A and 23A of the support members 22 and 23, which are oriented toward the operator, as shown in FIG. 7, are not parallel to the top face 21A and the under face 21B of the jig body 21, but parallel to the guide holes 35 respectively. Each of the faces 22C and 23C is formed to advance from the top face 21A toward the under face 21B along the extension from the exterior face of the jig body 21 toward the opening 25. In contrast with the case where the faces 22C and 23C are faces 22C' and 23C' parallel to the top face 21A and the under face 21B, the operator can readily check through a line-of-sight F that the end of the drill 37 reaches the edged face 2A of the spectacle lens 2, therefore properly ascertaining the timing of a large drill force downward, which is to be produced by the drill 37 by adding a large operating force to the lever 39.

In the embodiment, since the guide hole 35 as the guide portion which guides the drill 37 is formed in each of the support members 22 and 23 having the secondary portions 22B and 23B that support the spectacle lanes 2, a member for guiding the drill 37 does not need to be formed aside from the support members 22 and 23. Thus achieving the simplification of the formation of the drilling jig 20 and the reduction of parts.

Figure 8:
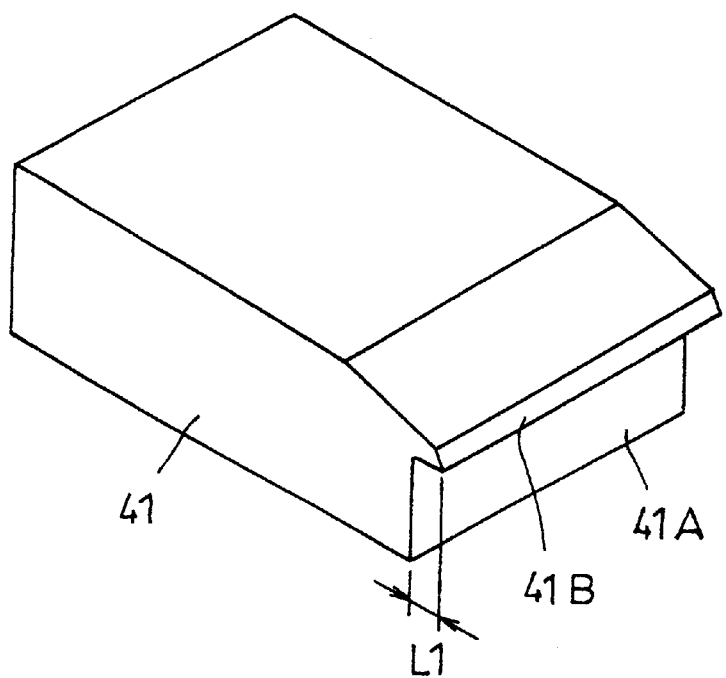
FIG. 8 is a perspective view showing a block gauge used for adjusting an attachment position of a support member used in the jig in FIG. 3.
Figure 9:
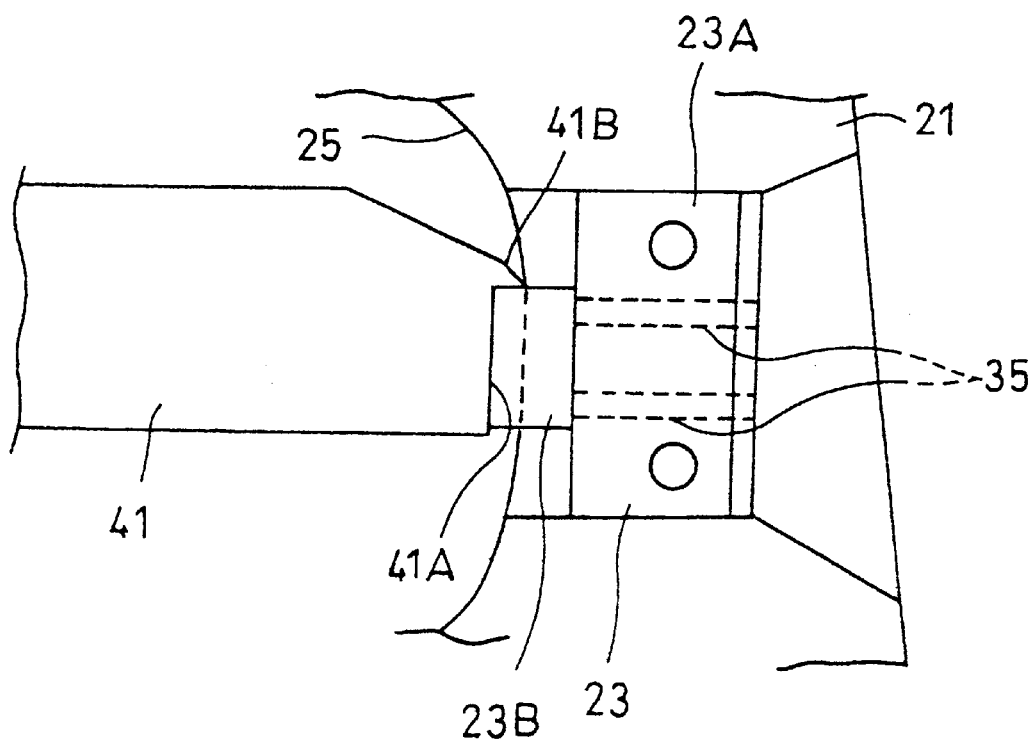
FIG. 9 is a plane view showing the operation of changing a position of the support member using the block gauge in FIG. 8.

When all of the lug portions 7 of the bridge 3 and the lug portions 8 of the end piece 4 shown in FIG. 2 cannot be inserted into the closed-end holes 9 as a result of an error in the length of the lug portion 7 or the lug portion 8, which is produced in manufacturing or processing, with respect to the depth of the closed-end hole 9 formed in the aforementioned operation, operation of changing an attaching position of the support member shown in FIG. 9 is carried out by using a block gauge 41 as an attaching position-adjustment member for a support member shown in FIG. 8.

The block gauge 41 shown in FIG. 8 has a projection 41B projecting from a side face 41A, and is prepared in plurality having different amounts of projection L1 of the projections 41B. When the attaching position of the support member 22 or 23 to the jig body 21 is changed, the bolts 34 shown in FIG. 5 are loosed to thereby allow the support member 22 or 23 to be moved forward and backward with respect to the opening 25. After the support member 22 or 23 is moved sufficiently away from the opening 25, as shown in FIG. 9, an end of a projection 41B of a block gauge 41, having the amount of projection L1 appropriate for a new attaching position of the support member 22 or 23, is laid on the inner circumferential face of the opening 25 of the jig body 21. Thereafter, the support member 22 or 23 is advanced until the end of the secondary portion 22B or 23B touches the side face 41A of the block gauge 41, and then the bolts 34 are screwed.

Accordingly, the attaching positions of the support members 22 and 23 in the jig body 21 are changed. The renewed drilling operation is performed by inserting the drill 37 into the guide hole 35 until the stopper 37A touches at the support member 22 or 23, thereby increasing the depth of the closed-end hole 9.

In the case of a formation in which the attaching positions of the support members 22 and 23 in the jig body 21 can be changed as described above, when a large amount of changing of the attaching position is not required, the diameter size of the bolt hole 33 shown in FIG. 5, through which the bolt 34 is passed, can be defined as a normal size with respect to the diameter of the bolt 34. When a large amount of changing of the attaching position is required, the diameter size of the bolt hole 33 can be increased or the bolt hole 33 can be formed into an elongated hole shape.

Figure 10:
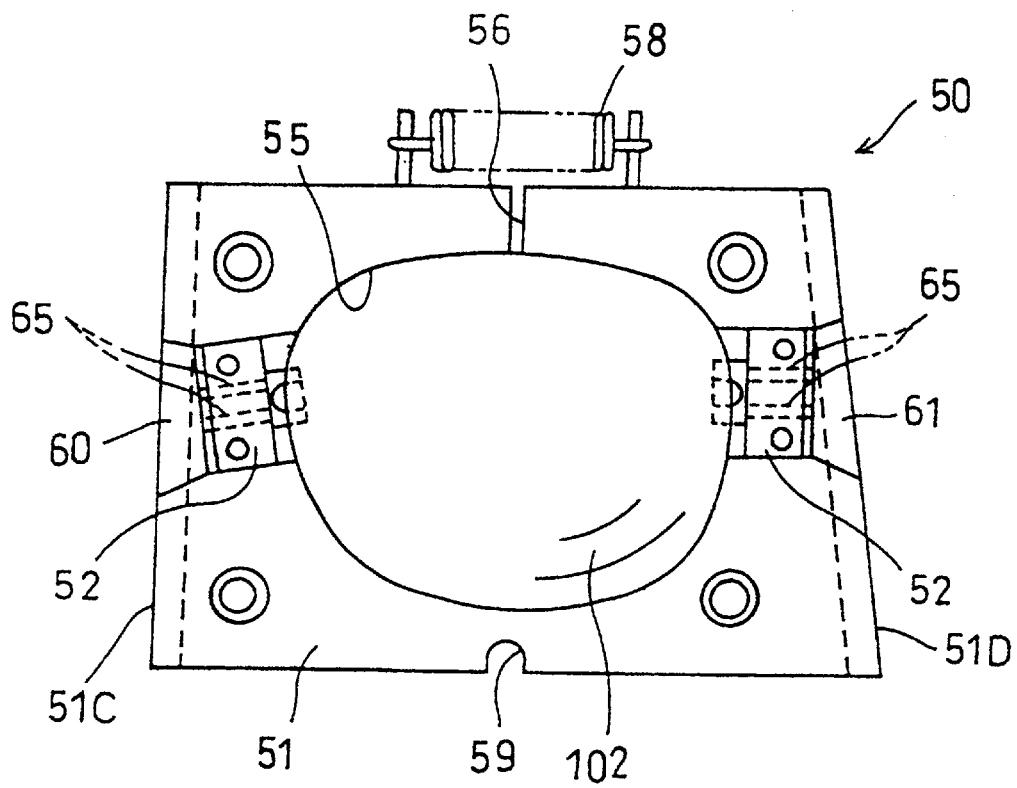
FIG. 10 is a plane view of a drilling jig used in the forming of a closed-end hole in an edged face of a spectacle lens having one of various configurations prescribed for patients.

The aforementioned drilling jig 20 is appropriate to use in forming the closed-end hole 9 in the spectacle lens 2 for demonstration-use when the convex face 2B as a face for supporting the lens has a spherical surface, whereas a drilling jig 50 shown in FIG. 10 is appropriate to use in forming the closed-end hole 9 in a spectacle lens 102 that is prescribed for a patient and has various types in which the configuration of a convex face 102B has an aspheric surface or a toric surface. The jig 50 is composed of a jig body 51 and two support members 52 attached in the jig body 51 to correspond to the bridge and the end piece of the spectacle frames. Similar to the aforementioned jig body 21 of the drilling jig 20, the jig body 51 is provided with an opening 55, a slit 56 and a notch 59, and a spring 58 is attached thereto. Side faces 51C and 51D of the jig body 51 have inclined angles corresponding to the angles B, C and D shown in FIGS. 3 and 4.

At positions in a top face of the jig 51 which correspond to the nose-side end portion and the ear-side end portion of the spectacle lens 102, slots 60 and 61 are formed. The support members 52 are respectively disposed and fixed in the slots 60 and 61 by bolts. FIG. 12 shows the support member 52 under magnification. The support member 52 has a primary portion 52A provided with a guide hole 65 guiding the drill 37, and a secondary portion 52B extending from the primary portion 52A to the inside of the opening 55. The secondary portion 52B is provided with two projections 62 of semi-circular cross-section which extends along the length of the secondary portion 52B on both sides in the width direction of the secondary portion 52B. As shown in FIG. 13, the projection 62 serves as a support portion supporting the spectacle lens 102. A lens corner 102C formed by an edged face 102A and the convex face 102B of the spectacle lens 102 is abutted to and supported on the projections 62.

In the drilling jig 50, the space S between the end of the guide hole 65 of the support member 52 and the edged face 102A of the spectacle lens 102 is also formed when the spectacle lens 102 is received on the projections 62.

In forming the closed-end hole 9 in the spectacle lens 102, similar to the drilling jig 20, the spectacle lens 102 is fitted into the opening 55 of the jig body 51 to orient the convex face 102B downward, and is retained therein by the holding force of the opening 55 which is caused by the spring 58. Where the closed-end hole 9 is formed using the guide hole 65 of, for example, the left support member 52 of the two support members 52, shown in FIG. 10, as the guide portion for the drill 37, at the outset, the left side portion (in FIG. 10) of the spectacle lens 102 is strongly pushed from the thickness direction of the lens 102 so that the lens corner 102C of the spectacle lens 102 is put on the two projections 62 formed in the secondary portion 52B of the left support member 52. Subsequently, the right side portion (in FIG. 10) of the lens 102 is pushed, whereupon the lens corner 102C in the right side portion is put on one of the two projections 62 formed in the secondary portion 52B of the support member 52 which is shown in the right side of FIG. 10, thereby the spectacle lens 102 is supported at three points.

That is to say, in the drilling jig 50, the spectacle lens 102 is first supported by the two projections 62 of one of the two support members 52, which has a pair of guide holes 65 to guide the drill 37 therein. After that, regarding the other support member 52, one of the two projections 62 formed in the other support member 52 supports the spectacle lens 102.

When the drilling operation is performed by the drill press 36 shown in FIG. 6 on the spectacle lens 102 that is supported at the three points by the support members 52 while being retained in the opening 55 of the jig body 51 as described thus far, similar to the case of the drilling jig 20, one of the side faces 51C and 51D of the jig body 51, which is opposite to the support member 52 having the guide holes 65 to insert the drill 37 therein, is placed on the bed 38 of the drill press 36, and then the drilling operation for the closed-end holes 9 is carried out by the drill 37.

When the drill 37 is inserted into the guide hole 65 of the other support member 52 to perform the drilling operation for the closed-end hole 9, the spectacle lens 102 is supported by the two projections 62 of the other support member 52 of the two support members 52 which is opposite the support member 52 having heretofore supported the lens on the two projections 62, and the support member 52 supports the spectacle lens 102 on one of the two projections 62 this time.

Figure 11:
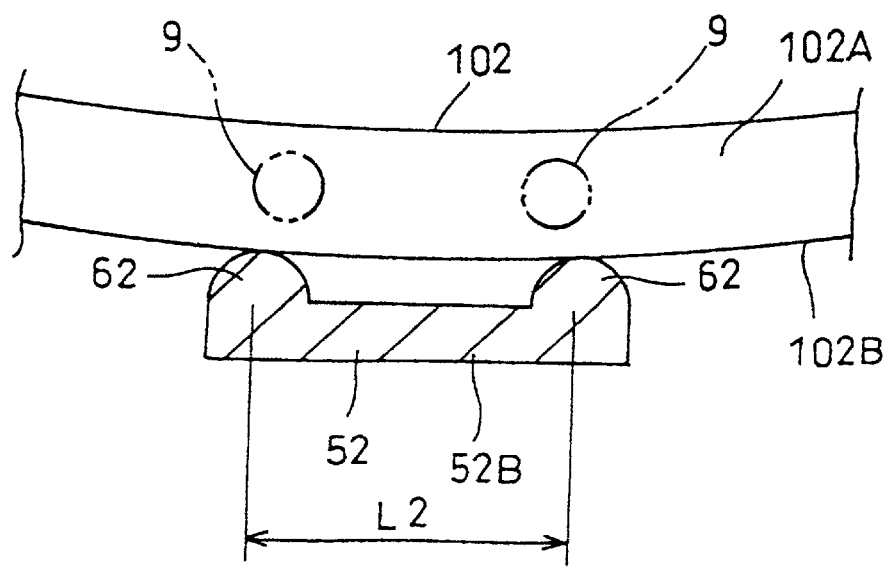
FIG. 11 is a vertically sectional view showing a situation in that the spectacle lens is received on a support portion of a support member used in the jig in FIG. 10.

The drilling jig 50 provided with the support member 52 having the aforementioned structural feature is effective in forming the closed-end hole 9 in each spectacle lens 102 shaped in various type configurations having the aspheric surface (including a progressive surface), the toric surface and so on. A distance L2 between the two projections 62 is preferably designed to correspond to a distance between the two guide holes 65 or to be slightly longer than that between the two guide holes. Where the distance L2 is the same length as or a similar length to that of the distance between the closed-end holes 9 in pair as shown in FIG. 11, a lens abutting position (supported position) can be placed on the vertical axis of the projection 62, and additionally, a distance from the lens supported position by the two projections 62 to the respective closed-end holes 9 can be set in a fixed distance. In consequence, when a pair of the closed-end holes 9 are formed in the edged face 102A of the spectacle lens 102 by the drill 37, each closed-end hole 9 in the spectacle lens 102 can be formed in the vicinity of the vertical axis of the projection 62, to be formed at an approximately predetermined position within the thickness of lens on which curvature and the like of the lens 102 have little effect.

In other words, the aforementioned drilling jig 20 is for the drilling operation on the spectacle lens 2 of which the configuration of the convex face 2B is a spherical surface and which has a shallow curve of lens diopter 0.00 (D), and additionally, each distance among the three support members 22 to 24 supporting the spectacle lens 2 is longer. Therefore, in order that a pair of the closed-end holes 9 to be formed in each of the nose-side and ear-side end portions of the spectacle lens 2, is drilled at an equal position in the thickness direction of lens on the edged face 2A of the spectacle lens 2, a pair of the guide holes 35, which are formed in each of the primary portions 22A and 23A of the support members 22 and 23, needs to be formed to change a distance from each bottom face of the primary portions 22A and 23A in conformance to the configuration and diopter of the lens, resulting in the manufacture of the support members 22 and 23 with a lot of time, work and effort. However, in the support member 52 of the drilling jig 50, although the closed-end hole 9 is formed in the spectacle lens 102 which has one of various types of convex curves, since the distance between the two projections 62 provided in the support member 52 for supporting the spectacle lens 102 is similar to a pitch between the two closed-end holes 9, a pair of the guide holes 65 may be simply formed at positions in the support member 52 which corresponds to the positions within the thickness of the spectacle lens 102 in consideration of a thickness of the projection 62 from a bottom face 52C of the support member 52, resulting in no such disadvantage as the drilling jig 20 has.

Figure 14:
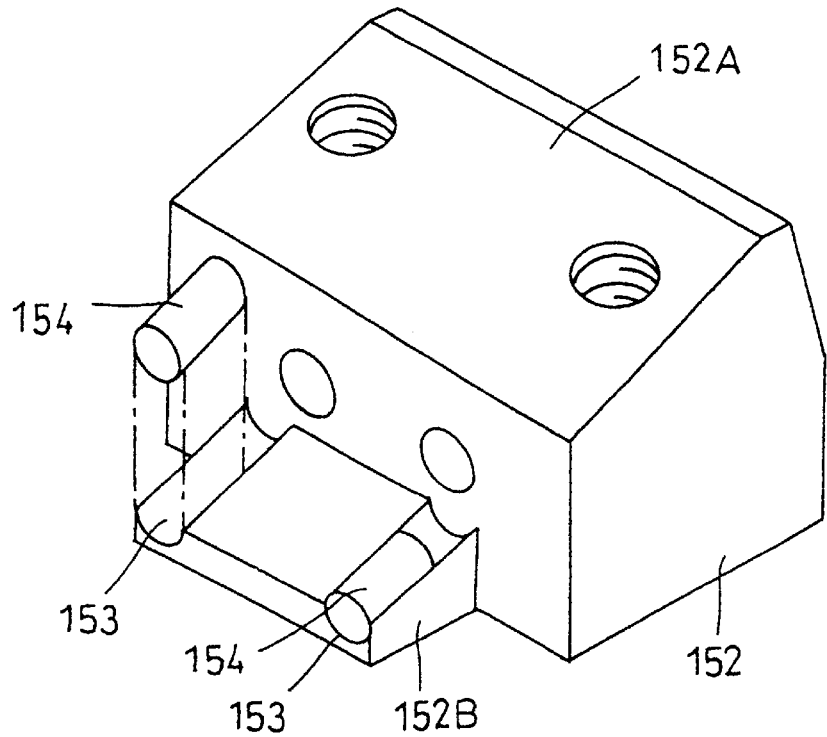
FIG. 14 is a perspective view showing the first modification of the support member used in the jig in FIG. 10.
Figure 15:
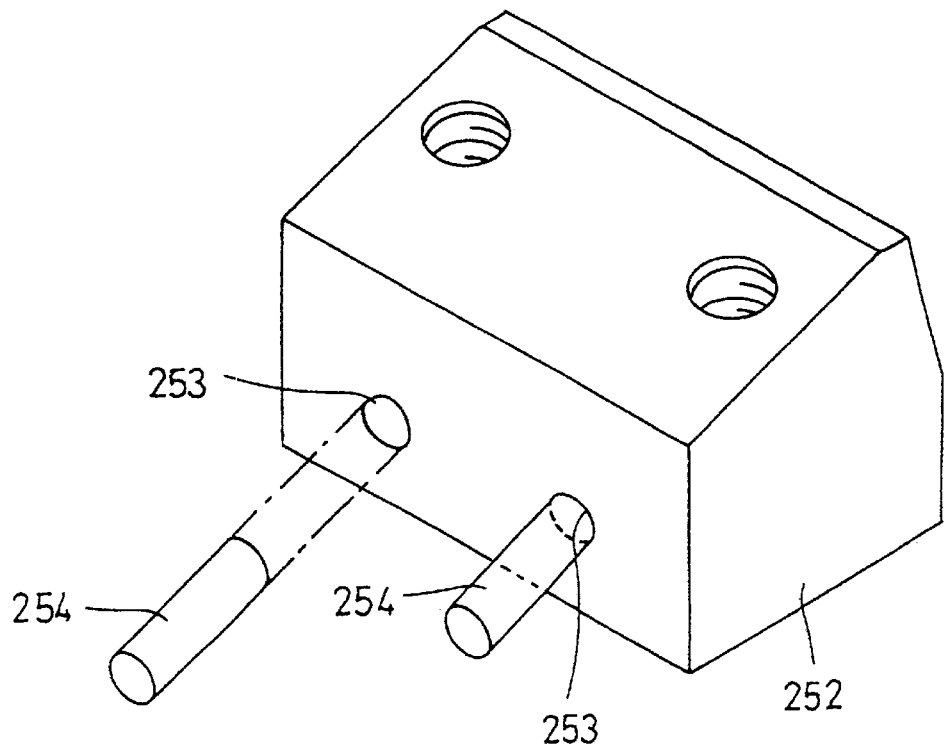
FIG. 15 is a perspective view showing the second modification of the support member used in the jig in FIG. 10.

FIG. 14 and FIG. 15 respectively show modifications of the support member. In a support member 152 in FIG. 14, recess portions 153 of a semi-circular shape are respectively formed on both side portions in the width direction of a secondary portion 152B which is combined with a primary portion 152A. A contact member 154 obtained by cutting a small-diameter rod material of circular cross-section is disposed in each recess portion 153. A support member 252 in FIG. 15 does not have a portion corresponding to the secondary portion. A pair of holes 253 are opened on a front face of a portion corresponding to the primary portion. A contact member 254 obtained by cutting a small-diameter rod material of circular cross-section is inserted into each hole 253.

Similar to the projection 62. of the support member 52 shown in FIG. 12, each of the above contact members 154 and 254 is in contact with the lens corner 102C of the spectacle lens 102, as the support portion supporting the spectacle lens 102. According to the modifications in FIGS. 14 and 15, it is not needed that the projection 62 of semi-circular cross-section shown in FIG. 12 which needs a lot of time, work and effort for producing is formed in the support members 152 and 252, and additionally, the contact members 154 and 254 are formed of the commercial small-diameter rod of circular cross-section, resulting in a reduction of the production cost of the support members 152 and 252.

The contact members 154 and 254 can respectively be undetachable or detachable from the support members 152 and 252. In the detachable contact member, even if the contact member 154 or 254 wears by repeatedly using the support member 152 or 252 for forming the closed-end holes 9 in a number of spectacle lenses 102, the support member 152 or 252 would not be entirely replaced and only the contact member 154 or 254 would be replaced.

FIG. 16 to FIG. 18 respectively show support members 352, 452 and 552, respectively capable of forming the closed-end holes 9 in central portions in the thickness directions of edged faces 202A, 302A and 402A of spectacle lenses 202, 302 and 402 each of which has a different lens-thickness from one another. In the support members 352, 452 and 552, guide holes 365, 465 and 565 are respectively formed at different positions in accordance with the lens-thicknesses of the spectacle lens 202, 302 and 402. Although there are various types of spectacle lenses having different lens-thicknesses in which the closed-end holes 9 is drilled by the drilling jig 50 shown in FIG. 10, the jig body 51 can be used commonly by only changing the support members.

Figure 19:
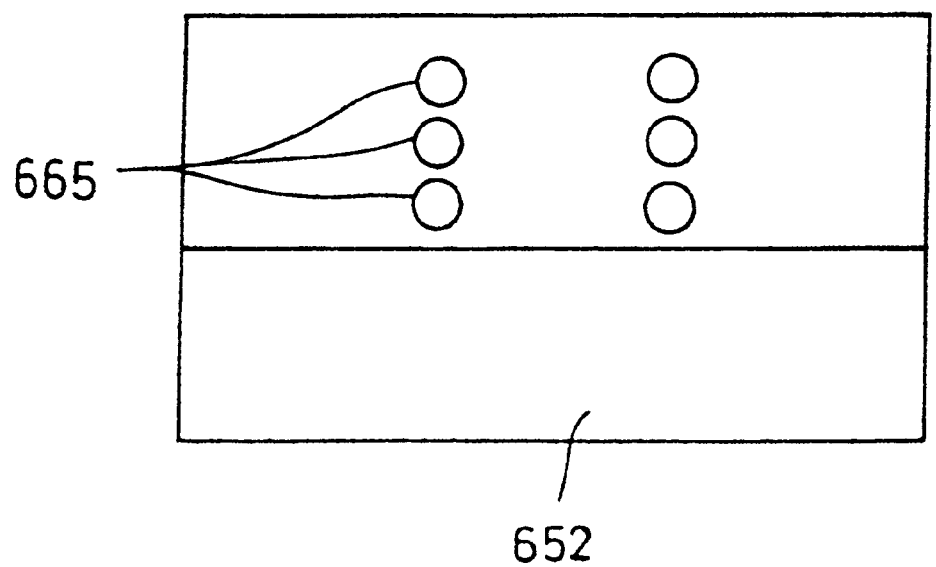
FIG. 19 is a back view of a single support member which functions as the three types of support members in FIGS. 16 to 18.
Figure 20:
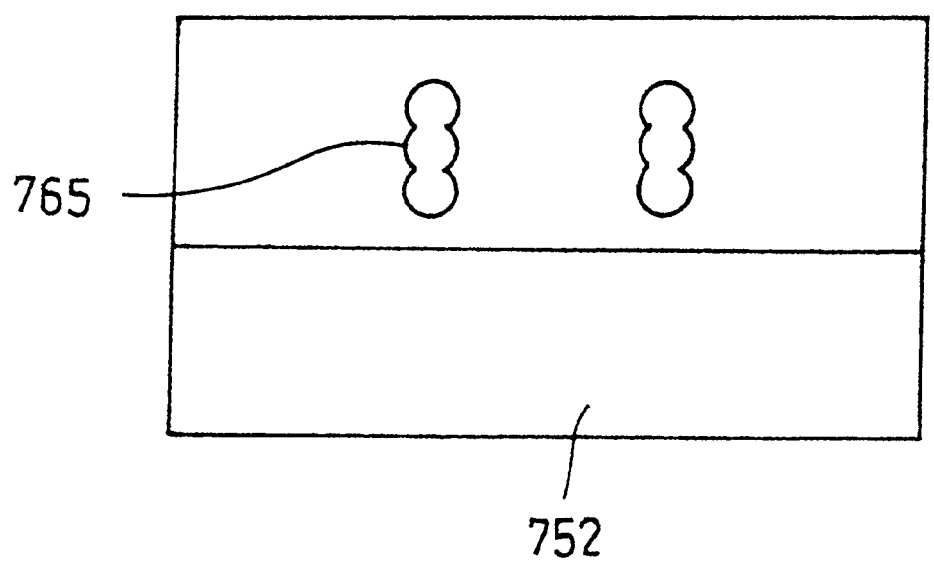
FIG. 20 is a back view of a modification of the support member in FIG. 19.

FIG. 19 shows a support member 652 capable of common use for a plurality of spectacle lenses having different lens-thicknesses. In the support member 652, a guide hole 665 is formed at a position corresponding to the formed positions of the guide holes 365, 465 and 565 in FIGS. 16 to 18. If the formed positions of the guide holes 365, 465 and 565 are close to one another, as shown in FIG. 20, a support member 752 provided with an elongated hole 765 shaped to join the three holes aligning vertically can be produced.

On the aforementioned description, the reason why the spectacle lens is retained in the drilling jig to orient its convex face downward, namely, to orient its convex face toward the support member is that the curvature and face-configuration of lens have little effect and the three-dimensional support position can be stabilized when the lens is supported by the support member, due to the fact that the convex face has smaller curvature and a simpler configuration in face-configuration than the concave face as the reverse side of the convex face from the view point of optical design of a lens.

Figure 21:
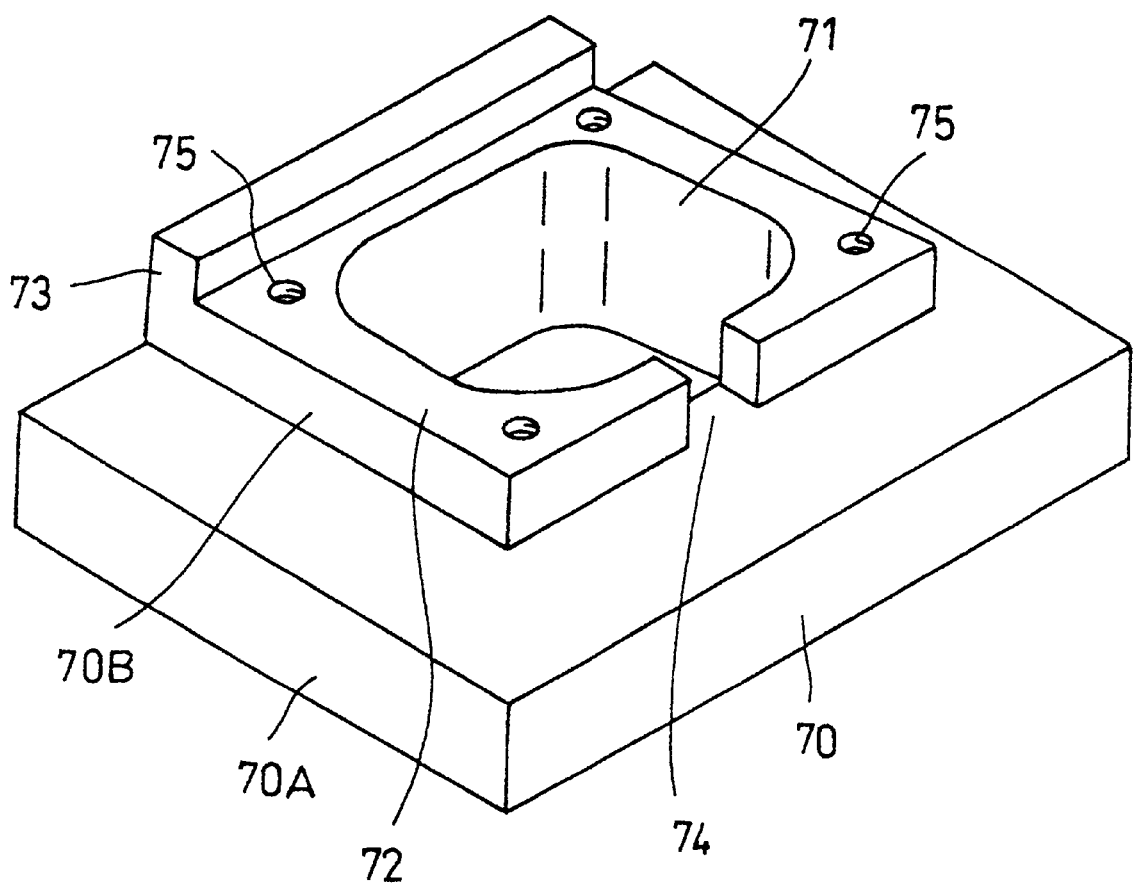
FIG. 21 is a perspective view of a manufacture jig used for manufacturing a jig body of a drilling jig.

FIG. 21 shows a manufacture jig 70 used for manufacturing, as shown in FIG. 22, the jig body 51 having a complicated configuration shown in FIG. 10 with ease. As will be clear from the following explanation, the manufacture jig 70 can be also used for manufacturing the jig body 21 shown in FIG. 3 and others.

As shown in FIG. 21, the manufacture jig 70 has a base 70B projected from a base rest 70A, and a through-hole 71 having a large area is formed at a central portion of the base 70B, so that the periphery of the base 70B results in a narrow-width protruded portion 72 surrounding the through-hole 71. On a side of the base 70B, a risen portion 73 is formed to stand straight up from the top face of the base 70B. The entire plane shape of the base 70B exclusive of the risen portion 73 is similar to the plane shape of the jig body 51, while a size of the entire plane shape is smaller than that of the plane shape of the jig body 51, and the diameter of the through-hole 71 is larger than that of the opening 55 of the jig body 51.

Therefore, since a width of the protruded portion 72 is smaller than a distance between the exterior face of the jig body 51 and the opening 55, the protruded portion 72 can be positioned between the exterior face and the opening 55 when the jig body 51 is put on the base 70B. In the base 70B, a chipped portion 74 reaching the through-hole 71 is formed, of which a width is wider than that of the notch 59 of the jig body 51. A plurality of screw holes 75 are opened in positions of the base 70B away from the through-hole 71, namely, on the protruded portion 72.

In manufacturing the jig body 51 using the manufacture jig 70, a material for a jig body having at least one side face perpendicular to an under face is prepared. Bolt holes 76 as shown in FIG. 22 are formed at respectively corresponding positions of the material to the screw holes 75. Thereafter, the material is placed on the protruded portion 72 to touch the above upright side face of the material to the risen portion 73. Bolts 77 are inserted into the bolt holes 76. The threaded-rod-side end portion of the bolt 77 is engaged with the screw hole 75, whereby the material is fixed onto the protruded portion 72 by the bolt 77 acting as a fixture, and the screw hole 75 acting as a joined portion connecting with the fixture. Subsequently, the manufacture jig 70 is fixed on a table of a processing machine such as a machining center or a milling machine.

The processing machine is provided with end mills 78 and 79 respectively having the inclined angled circumferential faces in accordance with the incline angles of the side faces 51C and 51D of the jig body 51, and a normal end mill 80 having a circumferential face perpendicular to the bottom face. The side faces 51C and 51D are formed by the end mills 78 and 79, and the opening 55 is formed by the end mill 80. The notch 59 and the slots 60 and 61 are formed by an end mill having a diameter smaller than that of the end mill 80.

As a result, the complicatedly shaped jig body 51 having the tilted side faces 51C and 51D, the opening 55 and the notch 59 is manufactured for only a single placement on the table of the processing machine, so that reorientation and replacement of the material on the table of the processing machine for repeating the working are avoided, thus greatly enhancing the production efficiency of the jig body 51.

It should be mentioned that the slit 56 of the jig body 51 can be formed by a cutting machine in the material state or after the manufacture process for the jig body 51 using the manufacture jig 70. Alternatively, a slit reaching the through-hole 71 and having a width lager than that of the slit 56 is formed in the base 70B inclusive of the risen portion 73 of the manufacture jig 70, whereby the slit 56 can be formed by an end mill while the material is fixed on the manufacture jig 70.

Figure 25:
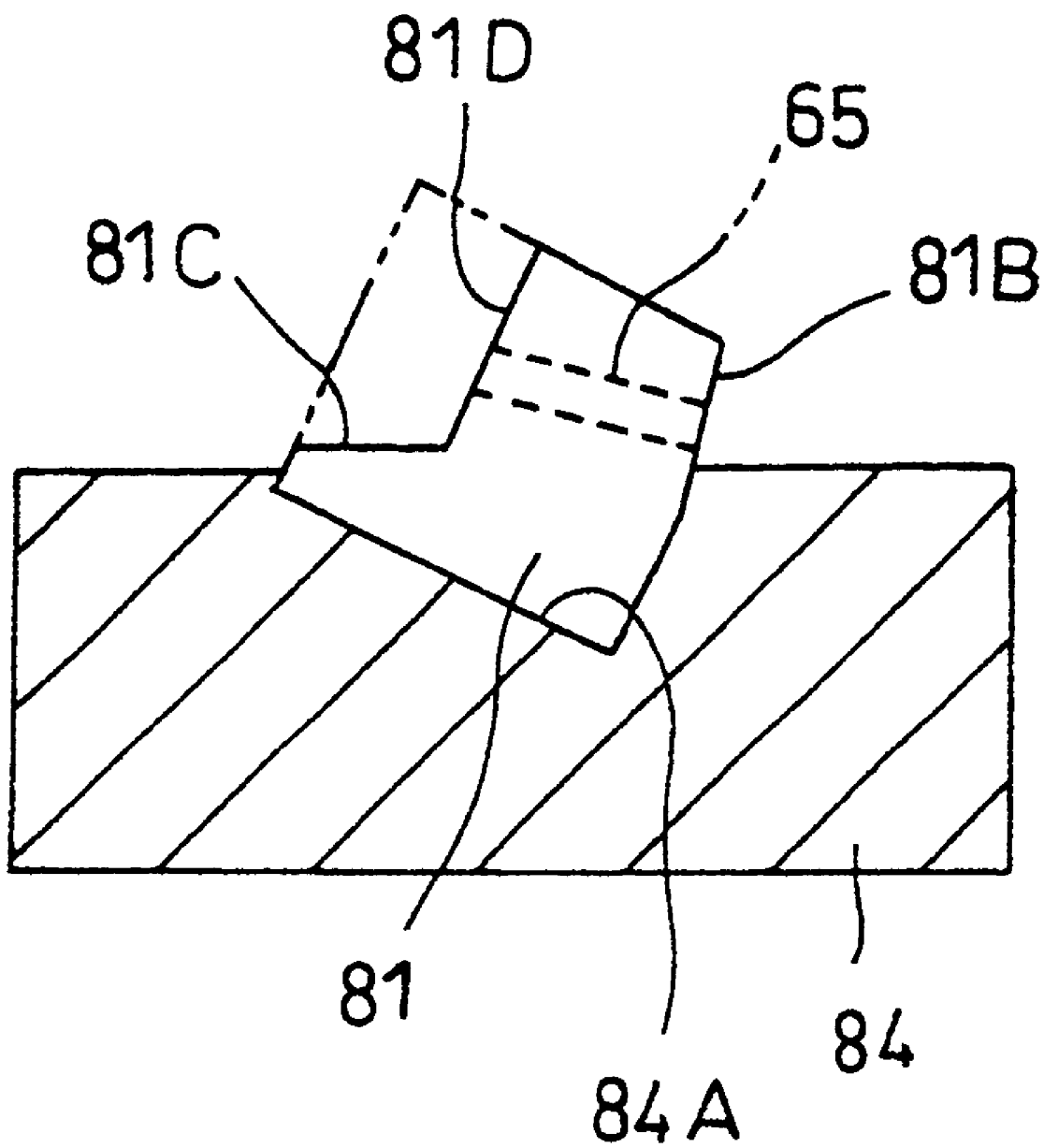
FIG. 25 shows the jig in section and is a side elevational view showing a second step when the support member is manufactured.

FIG. 23 to FIG. 25 show the case that the support member 52 shown in FIG. 10 and others is manufactured. Note that, the manufacture method can be used in manufacturing the aforementioned support members 22 and 23 and so on, as will be clear from the following explanation.

As shown in FIG. 23, a jig 82, having a square-shaped recess portion 82A allowing a top face 81A of a regular hexahedron-shaped material 81 having a predetermined width to be placed therein at a tilt from the horizontal direction, is prepared. After the material 81 is placed in the recess portion 82A, a part of the top face 81A is processed to make a horizontal face 81B by an end mill of the processing machine. The guide hole 65 having a right angle to the face 81B is formed in the face 81B by a drill press or the like, whereby the material 81 is shaped as shown in FIG. 24.

Subsequently, while the material 81 is placed in a square-shaped recess portion 84A of a jig 84 shown in FIG. 25, faces 81C and 81D of the material 81 are formed by the end mill of the processing machine. After that, a process of cutting out the secondary portion 52B having a smaller width than that of the primary portion 52A as shown in FIG. 12, and additional necessary processes are performed, thereby manufacturing the support member 52.

By the use of the jigs 82 and 84 shown in FIGS. 23 and 25 as described above, the support member 52 having a complicated configuration as shown in FIG. 12 and others can be simply manufactured.

INDUSTRIAL AVAILABILITY

As described hereinbefore, the present invention is useful to form a closed-end hole, extending inside a lens, on an edged face of a lens for inserting a lug portion of a bridge or an end piece of rimless spectacles therein.

What is claimed is:

1. A drill jig for a spectacle lens comprising:
   a holding portion for retaining a meniscus edged spectacle lens; and
   a guide portion for guiding a drilling instrument for drilling a closed-end hole in an edged face of the spectacle lens which extends inside the lens.

2. The drill jig for the spectacle lens according to claim 1, wherein said holding portion retains the spectacle lens by a holding force acting on the edged face of the spectacle lens in a direction towards the inside of the lens, and has a plurality of support portions each of which is inclined with respect to the direction of the holding force, and supports the spectacle lens.

3. A method of drilling a spectacle lens in which a closed-end hole for inserting a component of a spectacle frame is formed in an edged face of the spectacle lens and extends inside the lens, comprising the steps of:
   providing, in a drill jig retaining the spectacle lens, a support portion which abuts an outer circumferential edge of the spectacle lens to support the spectacle lens and a guide portion for guiding a drilling instrument for forming the closed-end hole, said spectacle lens having a convex face which is oriented downward; and
   drilling the closed-end hole to extend from the edged face of the spectacle lens towards the insides of the spectacle lens while the guide portion is guiding the drilling instrument,
   wherein a side face of the drill jig opposite a guide portion side is an inclined face which is perpendicular to the guide portion and the closed-end hole is drilled by orienting the inclined face on a horizontal bed of a processing device having the drilling instrument and guiding the drilling instrument in a vertical direction through the guide portion.

4. The drill jig for the spectacle lens according to claim 2, further comprising:
   a jig body; and
   a plurality of support members attached to the jig body;
   wherein said holding portion is formed in said jig body, said support portion is provided in said support member, said guide portion is provided in at least one of said support members, and a space exists between an end of said guide portion and the edged face of the spectacle lens supported by said support portion.

5. A drill jig for a spectacle lens comprising a jig body comprising a holding portion for retaining a meniscus edged spectacle lens by a holding force which acts on an edged face of the spectacle lens in a direction towards the inside of the lens, said holding portion comprising a plurality of support portions, each of which is inclined with respect to the direction of the holding force and supports the spectacle lens, a through-hole shaped opening corresponding to a lens shape formed in said jig body and a guide portion guiding a drilling instrument for drilling a closed-end hole through the edged face which extends inside of the lens, wherein said jig body additionally comprises a slit which extends from an exterior face of said jig body to said opening and an elastic member having an elastic tightening force acting in a direction that contracts a width of the slit and tightly retains the spectacle lens fitted in said opening, inside said opening.

6. The drill jig for the spectacle lens according to claim 5, wherein a notch portion is formed at a position opposite to said slit across said opening in said jig body.

7. The drill jig for the spectacle lens according to claim 1, wherein a side face opposite to the drilling instrument is an inclined face which forms a right angle with said guide portion.

8. The drill jig for the spectacle lens according to claim 2, wherein the number of support portions is three when the closed-end hole is formed in an edged face of a spectacle lens for demonstration-use.

9. The drill jig for the spectacle lens according to claim 2, wherein the number of support portions is four when the closed-end hole is formed in an edged face of a spectacle lens prescribed for a patient.

10. The drill jig for the spectacle lens according to claim 9, wherein two support portions are provided for each of said support members arranged approximately opposite to each other with respect to the spectacle lens.

11. A method of drilling a spectacle lens in which a closed-end hole for inserting a component of a spectacle frame is formed in an edged face of the spectacle lens and extends inside the lens, comprising the steps of:

providing, in a drill jig retaining the spectacle lens, a support portion which abuts an outer circumferential edge of the spectacle lens to support the spectacle lens and a guide portion for guiding a drilling instrument for forming the closed-end hole, said spectacle lens having a convex face which is oriented downward; and drilling the closed-end hole to extend from the edged face of the spectacle lens toward the insides of the spectacle lens while the guide portion is guiding the drilling instrument, wherein an opening which is formed in and passes through the drill jig, retains the spectacle lens, has eyebrow-side, cheek-side, nose-side and ear-side periphery portions in the vertical and lateral directions of the spectacle lens, the support portion and the guide portion are disposed in each of the nose-side periphery portion and earside periphery portion, the drill jig additionally comprises a slit extending from the exterior face of the drill jig to said opening, an elastic member changes the width of the slit by an elastic tightening force and the closed-end hole is drilled in the spectacle lens while it is fitted in the opening and retained by the elastic tightening force caused by the elastic member.

12. A method of drilling a spectacle lens in which a closed-end hole for inserting a component of a spectacle frame is formed in an edged face of the spectacle lens and extends inside the lens, comprising the steps of:

providing, in a drill jig retaining the spectacle lens, a support portion which abuts an outer circumferential edge of the spectacle lens to support the spectacle lens and a guide portion for guiding a drilling instrument for forming the closed-end hole, said spectacle lens having a convex face which is oriented downward; and drilling the closed-end hole to extend from the edged face of the spectacle lens towards the insides of the spectacle lens while the guide portion is guiding the drilling instrument, wherein the drill jig comprises a jig body having a holding portion for retaining the spectacle lens and a support member attached to the jig body and provided with the support portion and the guide portion, the support member is movable forward and backward with respect to the spectacle lens, which is retained by the holding portion of the jig body, the drilling instrument is guided by the guide portion of the support member and the closed-end hole is drilled by moving the drilling instrument towards the spectacle lens until a stopper, which is attached to the drilling instrument, touches the support member.

13. A method of drilling a spectacle lens in which a closed-end hole for inserting a component of spectacle frames is formed in an edged face of the spectacle lens and extends inside the lens, comprising the steps of:

providing, in a drill jig retaining the spectacle lens, a support portion which abuts an outer circumferential edge of the spectacle lens having a convex face oriented downward, to support the spectacle lens, and a guide portion for guiding a drilling instrument for forming the closed-end hole; and drilling the closed-end hole to extend from the edged face of the spectacle lens towards the insides of the spectacle lens, while the guide portion is guiding the drilling instrument.

14. The method of drilling the spectacle lens according to claim 13, wherein an opening, which is formed in and passes through the drill jig, retains the spectacle lens, has eyebrow-side, cheek-side, nose-side and ear-side periphery portions in the vertical direction and the lateral direction of the spectacle lens, the support portion and the guide portion are disposed in each of the nose-side periphery portion and the ear-side periphery portion; and the closed-end hole is drilled in the spectacle lens, which is retained by the support portion, by the drilling instrument which is guided by the guide portion.

15. A drill jig for a spectacle lens comprising a holding portion for retaining a meniscus edged spectacle lens by a holding force which acts on an edged face of the spectacle lens in a direction towards the inside of the lens; a plurality of support portions, each of which is inclined with respect to the direction of the holding force and supports a lens corner which is formed by the edged face and an optical surface of the spectacle lens; and a guide portion for guiding a drilling instrument for drilling a closed-end hole through the edged face which extends inside of the lens.

16. The method of drilling the spectacle lens according to claim 13, wherein the drill jig is composed of a jig body having a holding portion for retaining the spectacle lens, and a support member attached to the jig body and provided with the support portion, and a guide hole as the guide portion is formed in the support member; and the closed-end hole is drilled while the drilling instrument is inserted into and guided by the guide hole which extends toward an approximately middle point between a convex face and a concave face of the spectacle lens.

17. The method of drilling the spectacle lens according to claim 13, wherein the drill jig is composed of a jig body having a holding portion for retaining the spectacle lens, and a support member attached to the jig body;

the two support portions are provided in the support member, and a guide hole as the guide portion is formed at a position of the support member which corresponds to a position within a thickness of the spectacle lens in the vicinity of the vertical axis of each support portion; and the closed-end hole is drilled while the drilling instrument is inserted into and guided by the guide hole.

18. The method of drilling for spectacle lens according to claim 17, wherein the support portions are provided at two positions of a nose-side end portion and an ear-side end portion of the spectacle-lens holding portion formed in the jig body, and the spectacle lens is supported by the two support portions of the support member located in the nose-side end portion and one of the two support portions of the support member located in the ear-side end portion when the closed-end hole is drilled in the edged face of the spectacle lens positioned in the nose-side end portion, and the spectacle lens is supported by the two support portions of the support member located in the ear-side end portion and one of the two support portions of the support member located in the nose-side end portion when the closed-end hole is drilled in the edged face of the spectacle lens positioned in the ear-side end portion.

19. The method of drilling the spectacle lens according to claim 13, wherein a pair of lug portions is formed in the components of the spectacle frames, the drilling instrument for drilling the two closed-end holes, into which the lug portions are respectively inserted, in the edged face of the spectacle lens is prepared in a plurality of types having cutting parts of various diameters, and the closed-end hole is drilled by the drilling instrument having the cutting part of a diameter appropriate for a pitch of a pair of the lug portions.

20. The drill jig according to claim 15, further comprising a jig body comprising said holding portion and a plurality of support members attached to said jig body, wherein a support portion is provided in said support members and said guide portion is provided in at least one of said support members.

21. The drill jig according to claim 20, wherein a space is provided between an end of said guide portion and the edged face of the spectacle lens supported by said support portion.

* * * * *